US011071911B2

(12) United States Patent
Yabuki et al.

(10) Patent No.: US 11,071,911 B2
(45) Date of Patent: Jul. 27, 2021

(54) STORAGE MEDIUM STORING GAME PROGRAM, INFORMATION PROCESSING APPARATUS, INFORMATION PROCESSING SYSTEM, AND GAME PROCESSING METHOD

(71) Applicant: NINTENDO CO., LTD., Kyoto (JP)

(72) Inventors: Kosuke Yabuki, Kyoto (JP); Takeshi Miyamoto, Kyoto (JP); Shigeto Murata, Tokyo (JP); Shinya Nakano, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/689,496

(22) Filed: Nov. 20, 2019

(65) Prior Publication Data
US 2020/0086214 A1    Mar. 19, 2020

Related U.S. Application Data

(63) Continuation of application No. PCT/JP2017/019057, filed on May 22, 2017.

(51) Int. Cl.
*A63F 13/2145* (2014.01)
*A63F 13/42* (2014.01)

(52) U.S. Cl.
CPC .......... *A63F 13/42* (2014.09); *A63F 13/2145* (2014.09); *A63F 2300/1075* (2013.01)

(58) Field of Classification Search
CPC .................. A63F 13/42; A63F 13/2145; A63F 2300/1075
See application file for complete search history.

(56) References Cited

U.S. PATENT DOCUMENTS 7,309,287 B2 * 12/2007 Miyamoto .......... A63F 13/2145
                                                           463/37
7,578,742 B2 *  8/2009 Miyamoto .............. A63F 13/02
                                                           463/37
(Continued)

FOREIGN PATENT DOCUMENTS

CN       105872664 A     8/2016
EP       1 852 163 A2    11/2007
(Continued)

OTHER PUBLICATIONS

Extended European Search Report dated Oct. 5, 2020 issued in European Application No. 17910718.0 (11 pgs.).
(Continued)

*Primary Examiner* — Steven J Hylinski
(74) *Attorney, Agent, or Firm* — Nixon & Vanderhye PC

(57) ABSTRACT

An example of an information processing apparatus repeatedly acquires input positions detected by a pointing device, each position corresponding to a position on a display screen. The information processing apparatus executes a predetermined first process on an object in a virtual game space, at least on a condition that an input position detected when an input to the pointing device is started is within a predetermined area. The information processing apparatus sets a reference position, based on an input position regarding an input to the pointing device. The information processing apparatus executes a movement process for causing the object to move, based on the reference position and on the input position of the input which is continuously performed from start of the input to the pointing device.

20 Claims, 18 Drawing Sheets

(56) References Cited

U.S. PATENT DOCUMENTS

| | | | | |
|---|---|---|---|---|
| 8,172,681 | B2* | 5/2012 | Kando | G06F 3/04883 |
| | | | | 463/37 |
| 8,197,342 | B2* | 6/2012 | Kijima | A63F 13/42 |
| | | | | 463/37 |
| 8,608,561 | B2* | 12/2013 | Yamada | A63F 13/06 |
| | | | | 463/31 |
| 9,649,563 | B2* | 5/2017 | Lee | G06F 3/04886 |
| 10,335,678 | B2* | 7/2019 | Takahashi | G06F 3/04817 |
| 10,585,531 | B2* | 3/2020 | Ikeda | G06F 3/03 |
| 2006/0019752 | A1 | 1/2006 | Ohta | |
| 2006/0052166 | A1* | 3/2006 | Ohta | A63F 13/42 |
| | | | | 463/36 |
| 2006/0109259 | A1* | 5/2006 | Ohta | G06F 3/0485 |
| | | | | 345/173 |
| 2006/0128468 | A1* | 6/2006 | Yoshikawa | A63F 13/426 |
| | | | | 463/36 |
| 2007/0075985 | A1* | 4/2007 | Niida | A63F 13/2145 |
| | | | | 345/173 |
| 2009/0143141 | A1* | 6/2009 | Wells | G07F 17/3237 |
| | | | | 463/37 |
| 2012/0302338 | A1* | 11/2012 | Shikata | A63F 13/06 |
| | | | | 463/31 |
| 2012/0302345 | A1* | 11/2012 | Shikata | A63F 13/426 |
| | | | | 463/36 |
| 2012/0306775 | A1 | 12/2012 | Miyachi et al. | |
| 2013/0084980 | A1 | 4/2013 | Hammontree et al. | |
| 2013/0154974 | A1* | 6/2013 | Murata | A63F 13/92 |
| | | | | 345/173 |
| 2014/0256439 | A1* | 9/2014 | Wang | A63F 13/822 |
| | | | | 463/36 |
| 2014/0340329 | A1* | 11/2014 | Chen | G06F 3/0416 |
| | | | | 345/173 |
| 2015/0094127 | A1* | 4/2015 | Canose | G06F 3/04842 |
| | | | | 463/2 |
| 2015/0157932 | A1* | 6/2015 | Kwon | G06Q 50/00 |
| | | | | 463/31 |

FOREIGN PATENT DOCUMENTS

| | | |
|---|---|---|
| EP | 2 422 854 A2 | 2/2012 |
| JP | H11-95650 | 4/1999 |
| JP | 2002-000939 | 1/2002 |
| JP | 3734819 | 10/2005 |
| JP | 3734820 | 10/2005 |
| JP | 2012-252587 | 12/2012 |
| JP | 2013-127683 | 6/2013 |
| JP | 2016-120131 | 7/2016 |
| JP | 6097427 | 3/2017 |
| KR | 10-2011-0119227 | 11/2011 |

OTHER PUBLICATIONS

Extended European Search Report dated Dec. 20, 2019 issued in European Application No. 17905006.7 (10 pgs.).

International Search Report for PCT/JP2017/019057, dated Aug. 8, 2017, 4 pages.

Toshiaki Yasuda, "E3 2012, GREE Shutten Booth Report 'Metal Slug', 'Biohazard' Nado Shinsaku Title o Ikkyo ni Taiken", 'Wacky Mortors', [online], Jun. 8, 2012, Impress Corp., Game Watch, [retrieval data Jul. 19, 2017], Internet URL:http://game.watch.impress.co.jp/docs/news/538861.html (6 pages).

Mario Kart DS Kanpeki Bakuso Guidebook, 1st edition, Enterbrain, Inc., Jan. 24, 2006, p. 26 (4 pages).

U.S. Appl. No. 16/686,688 to Yabuki, et al., filed Nov. 18, 2019 (74 pages).

U.S. Appl. No. 16/688,156 to Yabuki, et al., filed Nov. 19, 2019 (75 pages).

U.S. Appl. No. 16/686,688, filed Nov. 18, 2019, Storage Medium Storing Game Program, Information Processing Apparatus, Information Processing System, and Game Processing Method.

U.S. Appl. No. 16/688,156, filed Nov. 19, 2019, Storage Medium Storing Game Program, Information Processing Apparatus, Information Processing System, and Game Processing Method.

U.S. Appl. No. 16/689,496, filed Nov. 20, 2019, Storage Medium Storing Game Program, Information Processing Apparatus, Information Processing System, and Game Processing Method.

Extended European Search Report dated Jan. 10, 2020 issued in European Application No. 17905004.2 (9 pgs.).

* cited by examiner

Fig.12

| INPUT POSITION DATA |
|---|
| REFERENCE POSITION DATA |
| INPUT INSTRUCTION DATA |
| OBJECT POSITION DATA |
| OBJECT STATE DATA |
| DETERMINATION AREA DATA |
| ACCELERATION FLAG DATA |

STORAGE MEDIUM STORING GAME PROGRAM, INFORMATION PROCESSING APPARATUS, INFORMATION PROCESSING SYSTEM, AND GAME PROCESSING METHOD

CROSS REFERENCE TO RELATED APPLICATION

The present application is a continuation application of International Patent Application PCT/JP2017/019057 filed on May 22, 2017, the entire contents of which is incorporated herein by reference.

FIELD

The present technology relates to a storage medium storing a game program, a game apparatus, a game system, and a game processing method, which use a pointing device to perform an input.

BACKGROUND AND SUMMARY

Conventionally, a technique of performing game operations by using a pointing device such as a touch panel has been proposed. For example, a game operation of causing an object in a game space to move is performed by using a pointing device.

A user interface which enables a user to perform more various game operations by using a pointing device has been desired.

Therefore, the present application discloses a storage medium storing a game program, a game apparatus, a game system, and a game processing method, which enable a user to perform various game operations by using a pointing device.

(1)

An example of a storage medium described herein stores a game program which causes a computer of an information processing apparatus to execute an acquisition step, a first process execution step, a reference position setting step, and a movement process step. In the acquisition step, the computer repeatedly acquires input positions detected by a pointing device, each position corresponding to a position on a display screen. In the first process execution step, the computer executes a predetermined first process on an object in a virtual game space, at least on a condition that an input position detected when an input to the pointing device is started is within a predetermined area. In the reference position setting step, the computer sets a reference position, based on an input position regarding an input to the pointing device. In the movement process step, the computer executes a movement process for causing the object to move, based on the reference position and on the input position of the input which is continuously performed from start of the input to the pointing device.

According to the configuration of above (1), the user can execute two types of processes, i.e., the first process and the movement process, on the object by a continuous input that is started from a position within the predetermined area. That is, the information processing apparatus allows the user to perform various operations by the simple input method according to the continuous input.

(2)

The predetermined area may be set so as to include a position on an input screen of the pointing device, the position corresponding to a position, on the display screen, in which the object is displayed.

According to the configuration of above (2), the user can properly determine whether or not to cause the information processing apparatus to execute the first process, depending on whether or not to perform an input to the position of the object. Therefore, the information processing apparatus allows the user to properly determine whether or not the first process is to be executed, by an intuitive operation.

(3)

The game program may further cause the computer to execute an image display step. In the image display step, the computer causes the display screen to display an image of the virtual game space such that the object is fixedly disposed at a predetermined position on the display screen, during a predetermined time period in which the first process is executable.

According to the configuration of above (3), the user can properly determine whether or not to execute the first process, regardless of the state of the object, by starting an input from the same position on the display screen. Thus, the information processing apparatus can improve operability of the above determination.

(4)

The game program may further cause the computer to execute an image display step. In the image display step, the computer causes the display screen to display an image of a game space that does not include an image representing the predetermined area, during a predetermined time period in which the first process is executable.

According to the configuration of above (4), the information processing apparatus does not display the image of the predetermined area, and therefore can simplify the game image. Thus, the information processing apparatus can reduce the processing load for generating the game image. In addition, since the predetermined area is set at the position of the object, the user can roughly recognize the position of the determination area through the image of the object even though the determination area is not displayed. Therefore, the information processing apparatus can provide an easy-to-view and easy-to-understand game image for the user.

(5)

The game program may further cause the computer to execute a reference position changing step. In the reference position changing step, the computer changes the reference position to a position within a predetermined distance from the input position of the input which is continuously performed from start of the input to the pointing device.

According to the configuration of above (5), regarding the input which is continuously performed from start of the input to the pointing device, the user can perform a movement operation even by an input at a position away from the object on the display screen. Therefore, when the user performs the input to the pointing device with his/her finger, for example, the user can prevent the object from being difficult to be viewed due to the finger performing the input. Consequently, the information processing apparatus can improve operability of the input to the pointing device.

(6)

In the first process execution step, a process for changing the state of the object may be executed as the first process.

According to the configuration of above (6), the user can perform both a movement operation on the object and an operation to change the state, by a continuous input to the pointing device. Thus, the user is allowed to perform multiple types of operations by the continuous input to the pointing device, thereby enabling the user to perform more various game operations.

(7)

In the first process execution step, a process for changing the state regarding movement of the object may be executed as the first process. In the movement process step, the computer may cause the object to move by different control methods depending on the state of the object.

According to the configuration of above (7), the user can change, through the first process, the control method for movement by the movement operation. Therefore, according to the configuration of above (7), the user can perform, by a continuous input, both the movement operation on the object and the operation to change the control method for movement by the movement operation. Thus, the user is allowed to perform various movement operations by the simple input method.

(8)

The game program may further cause the computer to execute a second process execution step. In the second process execution step, the computer executes a second process on the object, the second process being different from the first process, in the case where the input position detected when the input to the pointing device is started is within the predetermined area, and where the input which is continuously performed from start of the input satisfies a predetermined condition.

According to the configuration of above (8), after the user causes the information processing apparatus to execute the first process, the user can further cause the information processing apparatus to execute the second process by an operation that satisfies the predetermined condition. Thus, the user is allowed to perform multiple types of operations by a continuous input to the pointing device, thereby enabling the user to perform more various game operations.

(9)

In the second process execution step, a process regarding movement of the object may be executed as the second process.

According to the configuration of above (9), the user can perform the operation regarding movement of the object even after causing the information processing apparatus to execute the first process. Thus, the user is allowed to perform various operations regarding movement of the object by the simple input method.

(10)

In the second process execution step, the second process may be executed in response to end of the input which is continuously performed from start of the input to the pointing device.

According to the configuration of above (10), the user can cause the information processing apparatus to execute the second process by an operation to end the continuous input to the pointing device. Thus, the user is allowed to perform a game operation also by the operation to end the continuous input, in addition to the operation during the continuous input, thereby enabling the user to perform more various game operations.

(11)

In the first process execution step, a process for controlling action of the object may be executed as the first process, the process being different from the movement process.

According to the configuration of above (11), the user can perform both the movement operation on the object and the operation to cause the object to perform an action, by a continuous input to the pointing device. Thus, the user is allowed to perform multiple types of operations by the continuous input to the pointing device, thereby enabling the user to perform more various game operations.

This specification discloses examples of an information processing apparatus and an information processing system which executes the processes in the steps in above (1) to (11) (not limited to the mode of executing the steps by a program). In addition, this specification discloses a game processing method in which a computer executes the processes in the steps in above (1) to (11).

With the storage medium storing, the game apparatus, the game system, and the game processing method described above, a user is allowed to perform various game operations by using a pointing device.

These and other objects, features, aspects and advantages will become more apparent from the following detailed description when taken in conjunction with the accompanying drawings.

BRIEF DESCRIPTION OF THE DRAWINGS

FIG. 12 shows examples of data used for game processing in a non-limiting information processing system;

DETAILED DESCRIPTION OF NON-LIMITING EXAMPLE EMBODIMENTS

[1. Overall Configuration of System]

Figure 1:
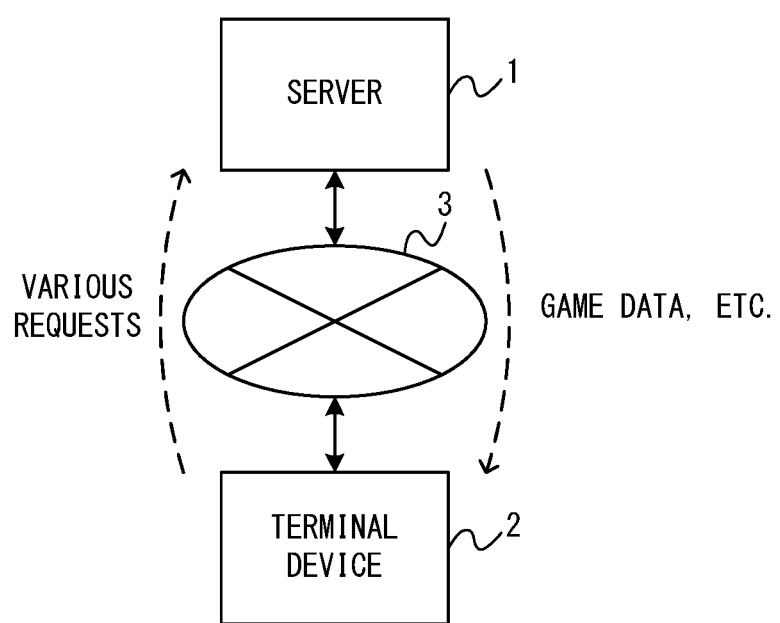
FIG. 1 is a block diagram showing an example of a configuration of a non-limiting information processing system according to an embodiment.

Hereinafter, an information processing system, an information processing apparatus, a game program, and a game processing method according to the present embodiment will be described. First, a description is given of the overall configuration of the information processing system according to the present embodiment, and the configurations of a terminal device and a server included in the information processing system. FIG. 1 is a block diagram showing an example of the configuration of the information processing system according to the present embodiment. As shown in FIG. 1, the information processing system includes a server 1 and a terminal device 2. The server 1 and the terminal device 2 are connectable to a network 3 such as the Internet and/or a mobile communication network. The server 1 and the terminal device 2 are communicable with each other via the network 3.

The server 1 is a server for providing services relating to applications to be executed in the terminal device 2. In the present embodiment, the server 1 is a game server for games to be executed in the terminal device 2. That is, the server 1 provides an environment for execution of game processing in the terminal device 2. For example, in response to a request from the terminal device 2 which executes game processing, the server 1 executes the game processing according to need, and transmits, to the terminal device 2, game data complying with the request.

The terminal device 2 is an example of an information processing apparatus possessed by a user. Examples of the terminal device 2 include: a smart phone, a hand-held or stationary game apparatus, a mobile phone, a tablet terminal, and a wearable terminal. The terminal device 2 can execute a game program (in other words, game application) for which the server 1 provides a service.

(Specific Example of Configuration of Server 1)

Figure 2:
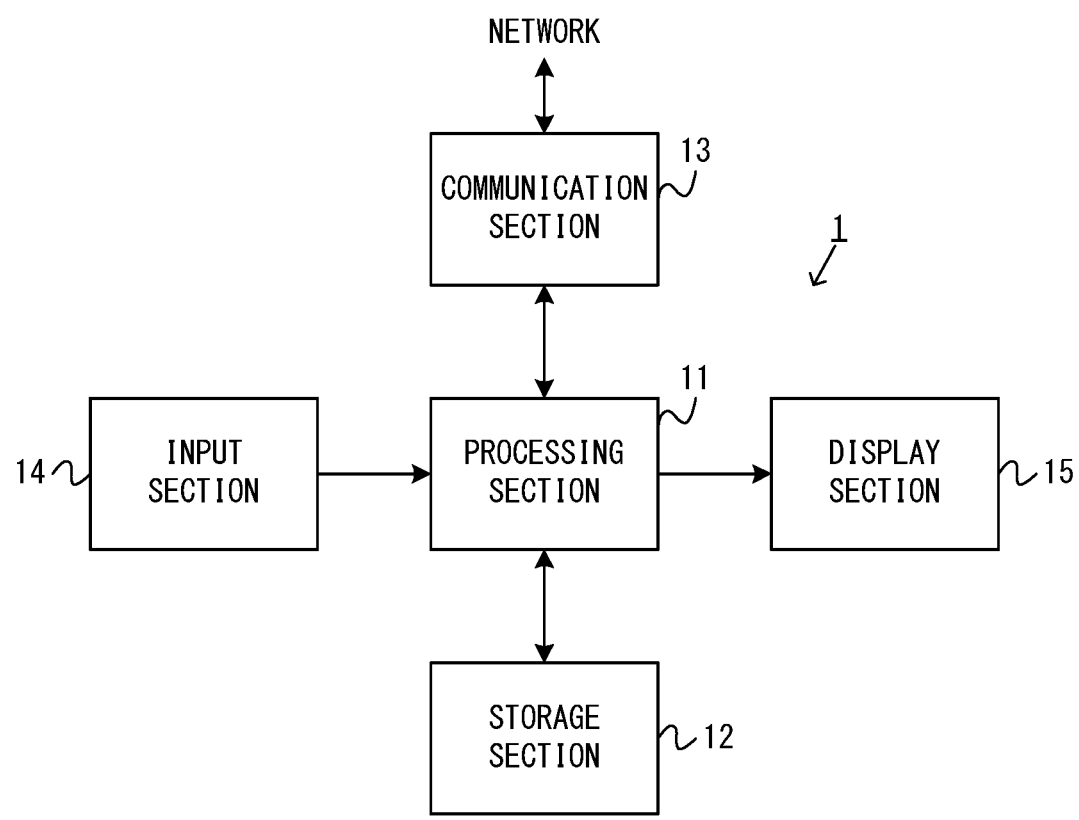
FIG. 2 is a block diagram showing an example of a configuration of a non-limiting server.

FIG. 2 is a block diagram showing an example of a configuration of the server 1. In FIG. 2, each of components of the server 1 is implemented by one or more information processing apparatuses. The hardware configuration of the server 1 of the present embodiment may be the same as that for a conventional server.

As shown in FIG. 2, the server 1 includes a processing section 11 and a storage section 12. The processing section 11 is electrically connected to the components 12 to 15 of the server 1. The processing section 11 includes a CPU (Central Processing Unit) and a memory. In the server 1, the CPU executes, using the memory, programs stored in the storage section 12, thereby executing various kinds of information processing. The storage section 12 is any storage device (also referred to as "storage medium") that is accessible by the processing section 11. The storage section 12 stores therein programs to be executed in the processing section 11, data to be used for information processing by the processing section 11, data obtained by the information processing, etc. In the present embodiment, the storage section 12 stores therein at least a program for game processing which is to be executed on the server side for game processing to be executed in the terminal device 2.

The server 1 includes a communication section 13. The communication section 13 is connected to the network 3, and has a function of communicating with other devices (e.g., the terminal device 2) via the network 3. The server 1 includes an input section 14 and a display section 15 as input/output interfaces.

(Specific Example of Configuration of Terminal Device 2)

Figure 3:
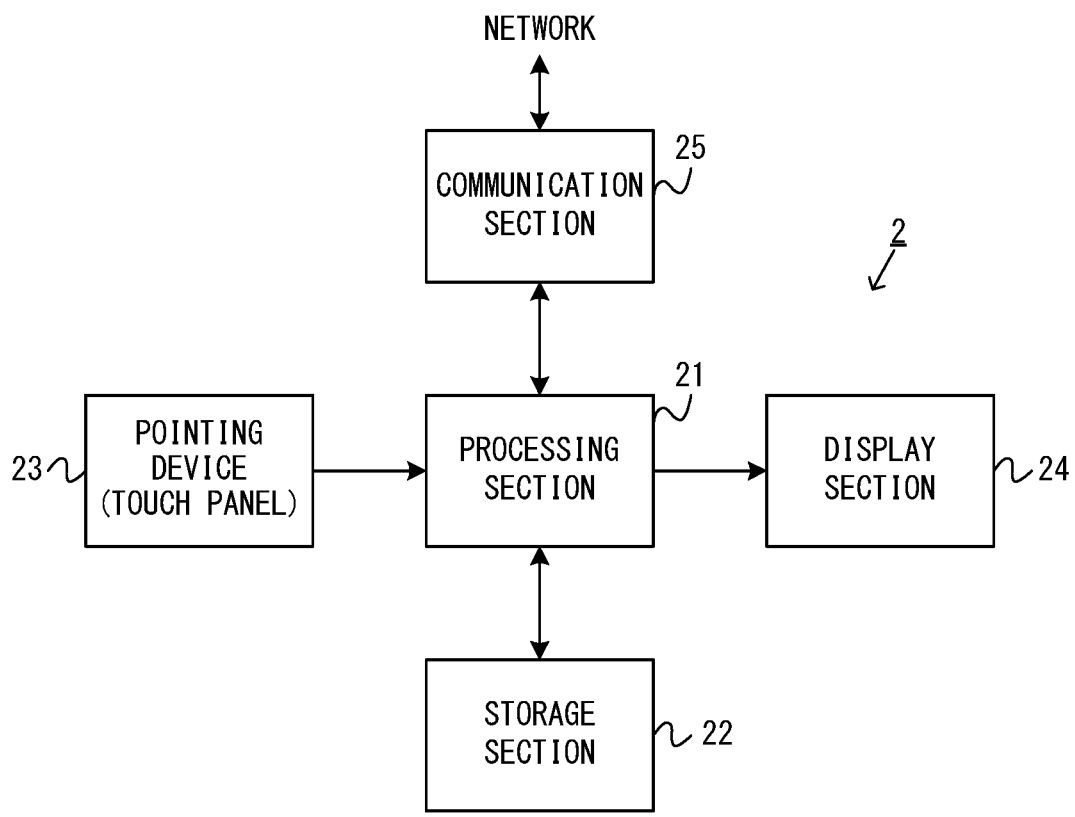
FIG. 3 is a block diagram showing an example of a configuration of a non-limiting terminal device.

FIG. 3 is a block diagram showing an example of a configuration of the terminal device 2. As shown in FIG. 3, the terminal device 2 includes a processing section 21 and a storage section 22. The processing section 21 is electrically connected to the components 22 to 25 of the terminal device 2. The processing section 21 includes a CPU and a memory. In the terminal device 2, the CPU executes, using the memory, programs (including the aforementioned game program) stored in the storage section 22, thereby executing various kinds of information processing. The storage section 22 stores therein programs to be executed in the processing section 21, data to be used for information processing by the processing section 21, and data obtained by the information processing, etc. The storage section 22 may be a storage medium (e.g., a card-type storage medium) that is attachable/detachable with respect to the terminal device 2.

The terminal device 2 includes a pointing device as an example of the input section. The pointing device is any input device having an input surface, and is capable of detecting a position designated on the input surface (by a user, for example). In the present embodiment, the pointing device is a touch panel 23 provided on a screen of a display section 24. The touch panel 23 detects a position designated by an input of touching (referred to as "touch input") on the input surface (in other words, a surface set on the screen of the display section 24).

The pointing device may be a touch type input device capable of detecting a position designated (by the user, for example) on an input surface, such as a touch screen, a touch panel, or a touch pad. The touch type input device may be an input device that allows contact or noncontact input to an input surface. That is, the touch type input device is not limited to a device capable of detecting a position of a touch input to the input surface, and may be an input device (e.g., an input device having a floating touch function) capable of detecting an input position by detecting a finger or the like disposed at a position a little distant from the input surface. That is, the touch type input device may detect a position designated by an input performed by disposing a finger or the like at a position a little distant from the input surface, instead of (or in addition to) a touch input performed on the input surface.

The pointing device is not limited to the touch type input device, and may be a mouse, or an operation apparatus that is moved by a user. The operation apparatus is able to designate a position on an input surface in accordance with the position and/or the direction of the operation device.

The terminal device 2 includes a display section 24. The display section 24 displays an image (e.g., a game image, etc.) generated by information processing executed in the processing section 21 of the terminal device 2.

The terminal device 2 includes a communication section 25. In the present embodiment, the communication section 25 has a function of performing communication while being connected to a mobile communication network (in other words, mobile telephone communication network). That is, the terminal device 2 (specifically, the processing section 21) is connected to the network 3 by using the communication section 25 (in other words, through the communication section 25) via the mobile communication network, and communicates with other devices (e.g., the server 1, etc.). The configuration of the communication section, through which the terminal device 2 performs communication via the network 3, is arbitrary. For example, the communication section 25 may have a function of connecting to a wireless LAN through a communication module with Wi-Fi authentication. Alternatively, the communication section 25 may have both a function of connecting to a mobile communication network and a function of connecting to a wireless LAN.

[2. Outline of Processing in Information Processing System]

Hereinafter, an outline of game processing executed in the information processing system will be described with reference to FIGS. 4 to 11. In the present embodiment, an exemplary case will be described, where game processing for a racing game in which a user (in other words, a player) operates an object representing a car (refer to FIG. 4) is executed in the information processing system.

In the present embodiment, the user performs an operation on the object by a touch input to the touch panel 23. That is, the terminal device 2 controls action (more specifically, movement) of the object, based on a touch input to the touch panel 23.

[2-1. Action of Object when No Touch Input is Performed]

Figure 4:
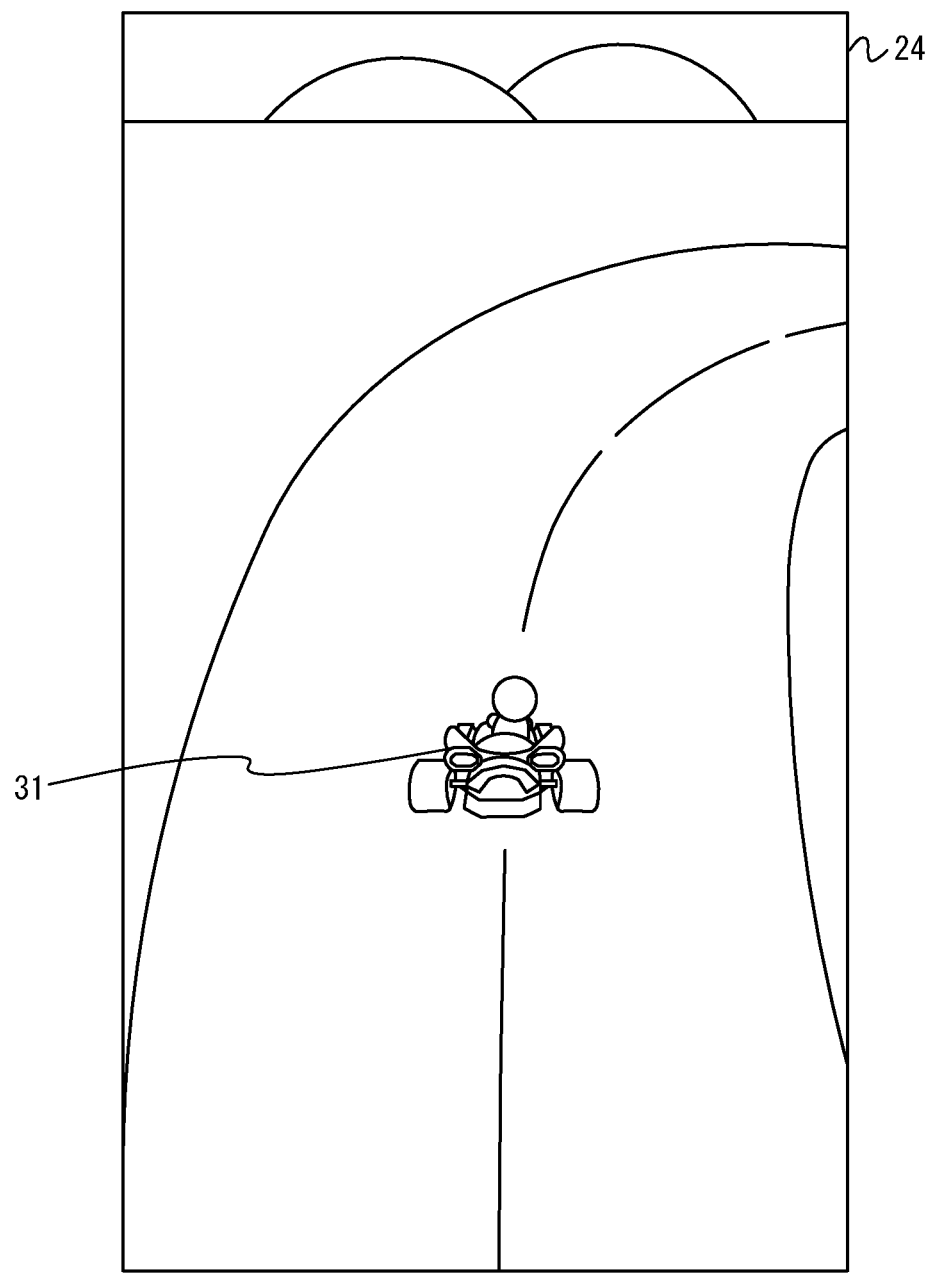
FIG. 4 shows an example of a game image.

First, an action in the case where no touch input is performed will be described. FIG. 4 shows an example of a game image. FIG. 4 shows a game image when no touch input is performed. As shown in FIG. 4, the terminal device 2 causes the display section 24 to display a game image including a virtual game space (in the present embodiment, a racing course), and an object 31 which appears in the game space. The object 31 is an object representing a car (and a character driving the car), and is operated by the user.

In the present embodiment, when no touch input is performed, the terminal device 2 controls movement of the object 31 automatically (i.e., according to a predetermined algorism). In this case, the object 31 is automatically controlled so as to advance along the racing course. In another embodiment, the terminal device 2 may control movement of the object 31 such that the object 31 advances straight, when no touch input is performed.

In the present embodiment, the speed of the object 31 is controlled automatically (e.g., at a fixed speed), except when an acceleration action described later is performed. In another embodiment, the speed of the object 31 may be controlled based on an input performed by the user. For example, the terminal device 2 may control the speed of the object 31, based on an instruction from the user (e.g., an instruction by a touch input to an accelerator button displayed on a screen).

In the present embodiment, the object 31 can take two types of states, i.e., a normal state and a drift state. Although details will be described later, the normal state and the drift state are different from each other in the content of a process of controlling movement of the object 31 based on a touch input by the user. In the present embodiment, the object 31 is in the normal state at least when no touch input is performed.

[2-2. Action of Object when Touch Input is Performed]

In the present embodiment, the user performs a movement operation on the object 31 by a touch input. In the present embodiment, the user is allowed to perform: a first movement operation in which a touch input is started at a position different from the position of the object 31 on the screen; and a second movement operation in which a touch input is started at the position of the object 31. When the first movement operation is performed, the terminal device 2 performs movement control for the object 31 in the aforementioned normal state. When the second movement operation is performed, the terminal device 2 performs movement control for the object 31 in the aforementioned drift state.

As described above, in the present embodiment, the type of a movement operation to be performed varies depending on whether or not an input position at the time of a touch-on of a touch input (hereinafter, this position is referred to as "touch-on position") is the position of the object 31. In this specification, "touch-on" means that a touch input is started. In other words, "touch-on" means a change from a state where no touch input is performed to a state where a touch input is performed. In this specification, end of a touch input, in other words, a change from a state where a touch input is performed to a state where no touch input is performed is referred to as "touch-off".

(Determination Area)

Figure 5:
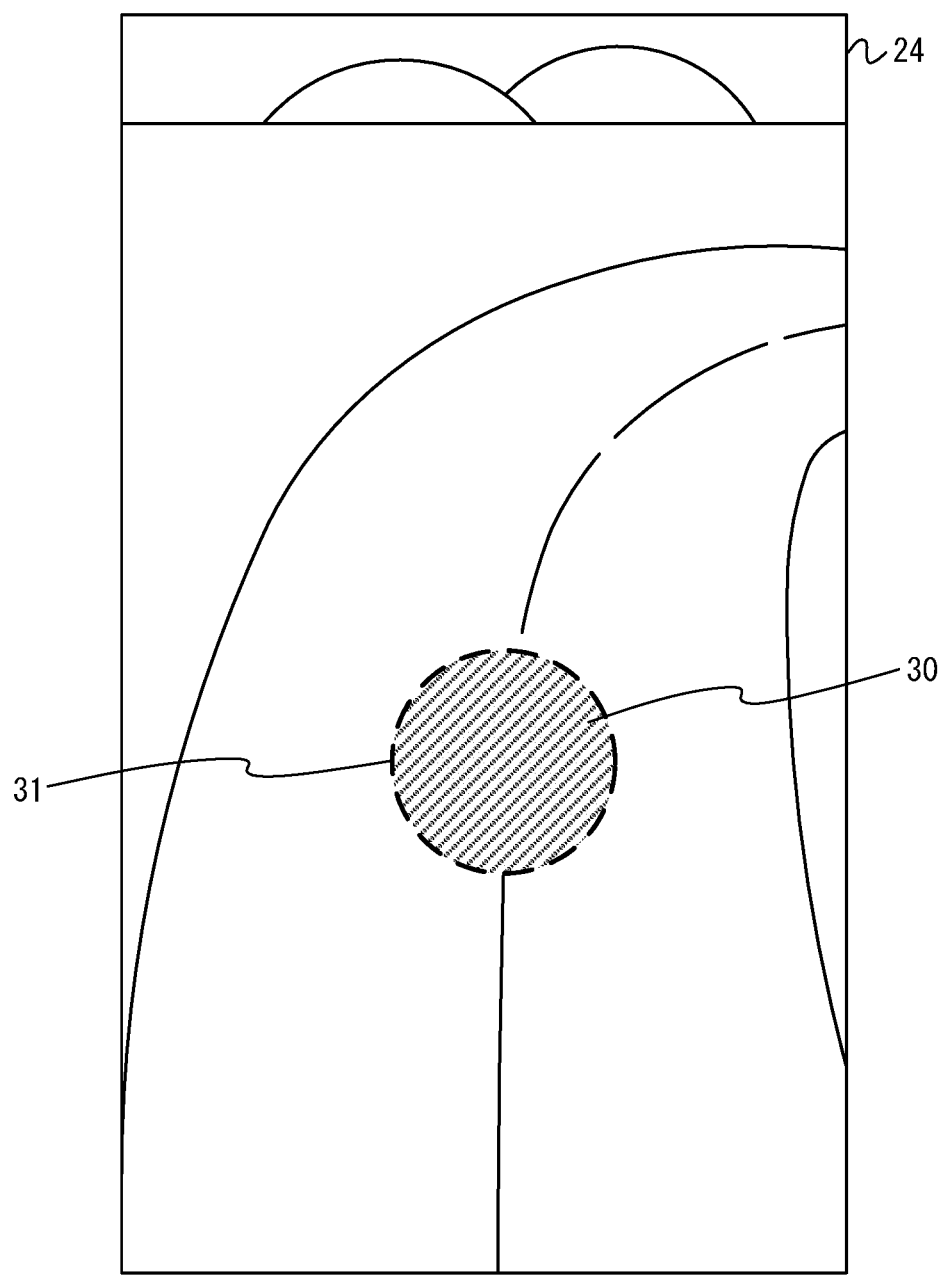
FIG. 5 shows an example of a determination area in the embodiment.

In the present embodiment, whether or not a touch-on position is the position of the object 31 is determined by using a determination area which is set on the input surface of the touch panel 23. FIG. 5 shows an example of the determination area in the present embodiment. The terminal device 2 determines whether the second movement operation is performed or the first movement operation is performed, depending on whether or not a touch-on position is within a determination area 30. That is, when the touch-on position is within the determination area 30, the terminal device 2 determines that the second movement operation is performed. When the touch-on position is outside the determination area 30, the terminal device 2 determines that the first movement operation is performed.

For example, when the input surface of the pointing device is set on the screen of the display device 24 as in the touch panel, an input position detected by the pointing device is, to be exact, a position corresponding to a position on the display screen. However, the input position substantially indicates a position on the display screen. Therefore, in the description of the present embodiment, for easy understanding, an input position and a determination area are sometimes described as positions on the display screen. The wording "an input position (or a determination area) is present at a specific position on the display screen" exactly means that the input position (or the determination area) is present at a position that is on the input surface and corresponds to the specific position on the display screen.

As shown in FIG. 5, in the present embodiment, the determination area 30 is set so as to include a position in which the object 31 is displayed (to be exact, the determination area 30 is set so as to include a position, on the input surface, corresponding to a position in which the object 31 is displayed on the display screen). In the present embodiment, the determination area 30 has a circular shape. In another embodiment, the determination area 30 may have any shape such as square, rectangular, etc., for example. In addition, the determination area 30 may be set so as to roughly include the object 31. In other words, the determination area 30 is not necessarily set so as to include the entirety of the object 31.

As described above, in the present embodiment, the user can properly use the two types of movement operations, depending on whether a touch input is started from the position of the object 31 to be operated by the user, or from a position different from the position of the object 31. Thus, the user can properly use the movement operations by an intuitive and easy method (even if the determination area 30 is not displayed as in the present embodiment).

In another embodiment, the determination area 30 is not limited to the position based on the position of the object 31, and may be set at another position (refer to modifications described later).

In the present embodiment, during a time period in which a movement operation can be performed (e.g., during a racing game), the terminal device 2 causes the display section 24 to display an image of a virtual game space such that the object 31 is fixedly disposed at a predetermined position on the display screen (in the present embodiment, a position on a slightly lower side from the center of the screen) (refer to FIG. 5, etc.). Thus, the determination area 30 is fixedly set so as to include the aforementioned predetermined position. Therefore, in the present embodiment, the user may start a touch input from the same position when performing the second movement operation, whereby the terminal device 2 can improve operability of the second movement operation.

In another embodiment, the position of the object 31 on the display screen may be changed as appropriate. At this time, the terminal device 2 may set the determination area 30, based on the position of the object 31. That is, the determination area 30 may be set so as to move in accordance with the position of the object 31 moving on the screen (specifically, so as to include the position of the object 31).

While in FIG. 5 the determination area 30 is represented as a hatched region encircled by a broken line, an image representing the determination area 30 is not actually displayed in the present embodiment. That is, the terminal device 2 causes the display section 24 to display an image of a game space that does not include an image representing the determination area 30, during the time period in which the movement operation can be performed. Thus, the terminal device 2 can simplify the game image, and can provide the object 31 and the like in an easy-to-view manner for the user. In the present embodiment, since the determination area 30 is set at the position of the object 31, the user can roughly recognize the position of the determination area 30 through the image of the object 31 even though the determination area 30 is not displayed. Therefore, in the present embodiment, the position of the determination area 30 can be provided in an easy-to-understand manner for the user, and an easy-to-view game image can be provided to the user.

In another embodiment, the terminal device 2 may cause the display section 24 to display an image representing the determination area 30 (refer to FIG. 17 relating to a modification described later).

As described above, in the present embodiment, the user can properly use the two types of movement operations, depending on whether the movement operation starting position is the position of the object 31 (i.e., within the determination area 30) or a position different from the position of the object 31 (i.e., outside the determination area 30).

[2-2-1. First Movement Operation]

Figure 6:
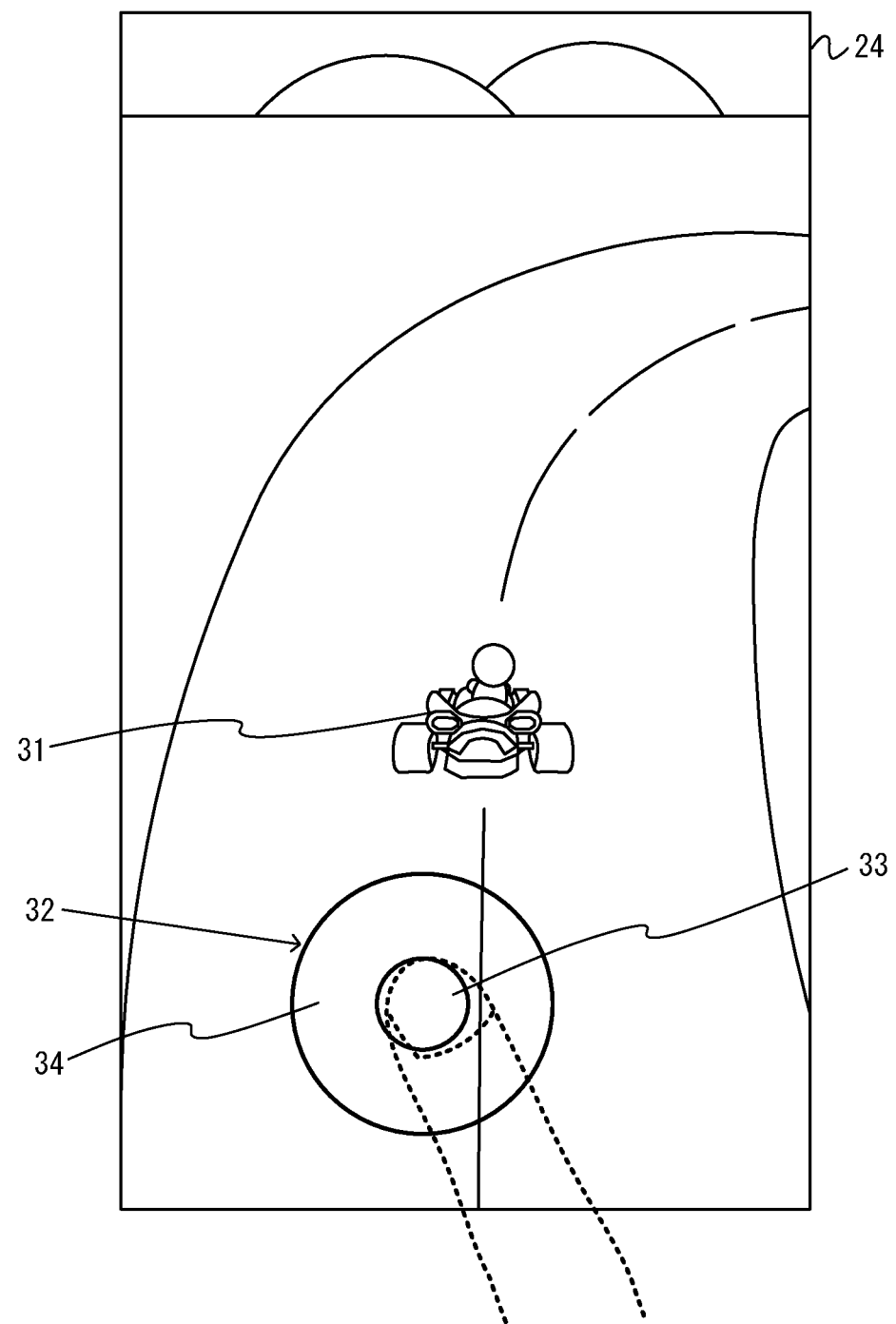
FIG. 6 shows an example of a game image when a touch input is started in the case where a first movement operation is performed.

An action in the case where the first movement operation is performed will be described with reference to FIGS. 6 to 8. FIG. 6 shows an example of a game image when a touch input is started in the case where the first movement operation is performed. As shown in FIG. 6, when a touch input is started at a position outside the determination area 30, the terminal device 2 determines that the first movement operation is performed.

In the present embodiment, when a touch input of a movement operation (i.e., the first or second movement operation) is started, the terminal device 2 first sets a reference position, based on an input position at the time of a touch-on, i.e., an input position at the start of the touch input. Although details will be described later, the reference position is a position used for specifying the content of an input instruction by the touch input. In the present embodiment, an input position at the time of the touch-on is set as a reference position.

In another embodiment, a reference position that is set at the time of a touch-on may be any position that is set based on an input position at the time of the touch-on. For example, when an input position at the time of a touch-on is located near an end of the screen of the display section 24, the terminal device 2 may set, as a reference position, a position at a predetermined distance from the end of the screen, based on the input position. In this case, the user can designate an input position that is by the predetermined distance away from the reference position in any direction. Alternatively, in the above case, a reference position may be set at a position within a distance of a radius r2 of a reference position image described later from the end of the screen. In another embodiment, a reference position that is set at the time of a touch-on may be fixedly set regardless of an input position at the time of the touch-on. That is, the terminal device 2 may set a predetermined position (e.g., a center position of the screen of the display section 24) as a reference position.

In another embodiment, a reference position may be set at a position independent of an input position at the time of setting the reference position. For example, in the case where the terminal device 2 receives a tap operation (e.g., a touch-input operation in which a time period from a touch-on to a touch-off is shorter than a predetermined time period) in addition to the movement operation, the terminal device 2 may determine whether or not the elapsed time from the touch-on exceeds the predetermined time period, for the purpose of determining whether the operation by the started touch input is the movement operation or the tap operation. In this case, the terminal device 2 may set, as a reference position, an input position at the time when the predetermined time period has passed from the touch-on in the movement operation.

In the present embodiment, the user can start a touch input for a movement operation, with any position on the input surface of the touch panel 23 being an input start position. That is, in response to a touch input being started at any position on the input surface, the terminal device 2 executes a process of setting a reference position and a process of specifying an input instruction described later. However, in another embodiment, the terminal device 2 may execute these processes on condition that a touch input is started within a predetermined input reception area in the input surface. The input reception area may be, for example, an area (different from the determination area 30) that is set based on the position of the object 31, or a predetermined area.

As shown in FIG. 6, while a touch input to the touch panel 23 is performed, the terminal device 2 causes the display section 24 to display an operation image 32 in addition to a game image. In FIG. 6, a finger of the user who performs the touch input is represented by a dotted line. In the present embodiment, the operation image 32 includes an input position image 33 and a reference position image 34.

The input position image 33 is an image representing a position that is located on the input surface of the touch panel 23 and is the current input position. Specifically, the input position image 33 represents a circular region having a radius r1 around the input position (refer to FIG. 7). The reference position image 34 is an image representing a position that is located on the input surface of the touch panel 23 and is a reference position. Specifically, the reference position image 34 represents a circular region having a radius r2 (>r1) around the reference position (refer to FIG. 7).

As described above, in the present embodiment, since the operation image 32 is displayed, the user can visually recognize the input position and the reference position. This allows the user to easily perform an input according to his/her intention, and the terminal device 2 can improve operability for the touch input. As shown in FIG. 6, the operation image 32 of the present embodiment is an image representing a slide pad that is an example of a direction input device. However, in another embodiment, the operation image 32 may be any image representing a reference position and an input position. In still another embodiment, no operation image 32 may be displayed on the display section 24.

After starting the touch input, the user performs a movement operation on the object 31 by the touch input being continued, specifically, by a sliding operation. That is, in the present embodiment, the user performs, by the touch input, an input instruction for instructing a movement direction of the object 31. Hereinafter, a method of performing an input instruction will be described with reference to FIG. 7.

Figure 7:
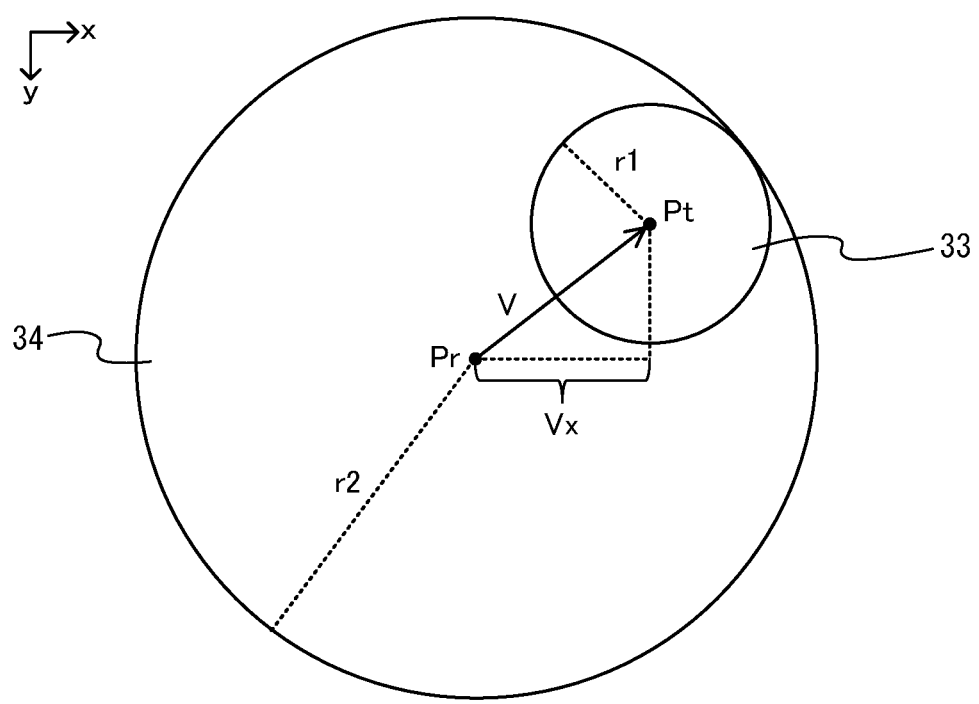
FIG. 7 shows an example of an operation image.

FIG. 7 shows an example of an operation image. In FIG. 7, a reference position and an input position are shown in addition to an operation image 32 displayed on the display section 24. In the present embodiment, the input position is acquired, from the touch panel 23, as two-dimensional coordinates indicating a position on the input surface. In addition, each of the input position and the reference position is stored as two-dimensional coordinates in the terminal device 2.

FIG. 7 shows a state where, after a touch-on, an input position Pt has been shifted from a position at the time of the touch-on (i.e., from a reference position Pr). An input instruction by a touch input is performed while the touch input is continued from the touch-on. Here, a touch input which is continuously performed from a touch-on (i.e., which is performed without interruption from a touch-on) is referred to as "continuous touch input". The terminal device 2 specifies the content of the input instruction based on the reference position and the input position, while the continuous touch input is being performed. In the present embodiment, as values representing the content of the input instruction, an input direction and an input distance are calculated.

The input direction is calculated based on a vector V from the reference position Pr to the input position Pt. The vector V is a vector having the reference position Pr as a start point, and the input position Pt as an end point. In the present embodiment, the input direction is calculated as a direction of an x-axis component of the vector V (in other words, a component in a transverse direction on the input surface). That is, in the present embodiment, the input direction is calculated as a rightward direction (i.e., x-axis positive direction) or a leftward direction (i.e., x-axis negative direction).

The input distance is calculated based on the magnitude of the vector V. In the present embodiment, the input distance is calculated as a magnitude Vx of the x-axis component of the vector V.

As described above, in the present embodiment, an input instruction corresponds to a direction and a magnitude regarding a one-dimensional direction (specifically, x-axis direction). Therefore, an input instruction may be represented as a numerical value, such as "−2" or "1", in which an input direction is represented as a positive or negative sign and an input distance is represented as an absolute value.

In another embodiment, an input instruction may be a direction and a magnitude regarding a two dimension. That is, an input instruction may have the direction of the vector V being an input direction, and the magnitude of the vector V being an input distance. In still another embodiment, an input instruction may include only one of an input direction and an input distance.

The terminal device 2 controls action (specifically, movement) of the object 31, based on the aforementioned input instruction. In other words, the object 31 is controlled based on the input position and the reference position. A specific control method for the object 31 is arbitrary. In the present embodiment, the terminal device 2 controls the object 31 such that the object 31 makes a turn by an amount of turn according to the input distance, in a direction according to the input direction. That is, the object 31 moves so as to make a longer turn to the right as the input position Pt is more distant from the reference position Pr in the rightward direction, and moves so as to make a longer turn to the left as the input position Pt is more distant from the reference position Pr in the leftward direction. The direction and amount of turn of the object 31 may be calculated based on a straight advance direction, or may be calculated based on an advance direction of the object 31 when the object 31 automatically travels (i.e., when no touch input is performed). Furthermore, as described above, in the present embodiment, the speed of the object 31 is automatically controlled except when an acceleration operation is performed.

As described above, in the present embodiment, the terminal device 2 controls movement of the object 31, based on an input distance that is a distance between a reference position and an input position continuously acquired after a touch-on, and on an input direction that is a direction from the reference position to the input position. According to this control, the user can perform an operation on an object by a simple operation method which is a touch input continued from a touch-on (i.e., continuous touch input). In another embodiment, movement of the object 31 may be controlled based on at least one of the input distance and the input direction.

The terminal device 2 may start control for the object 31 on condition that an input distance exceeds a predetermined control start distance, in the first movement operation (the same applies to the second movement operation). At this time, control for the object 31 is not performed during a time period from when an input is started to when an input position is adequately away from a reference position. Thus, it is possible to reduce a risk that movement control for the object 31 is performed against the user's intention when, for example, the user accidentally performs a touch input without intending to perform a movement operation (more specifically, for example, when a finger of the user hits the input surface of the touch panel 23).

(Reference Position Changing Process)

In the present embodiment, a reference position set at the time of a touch-on may be changed while a touch input continued from the touch-on is being performed. Hereinafter, a reference position changing process will be described.

Figure 8:
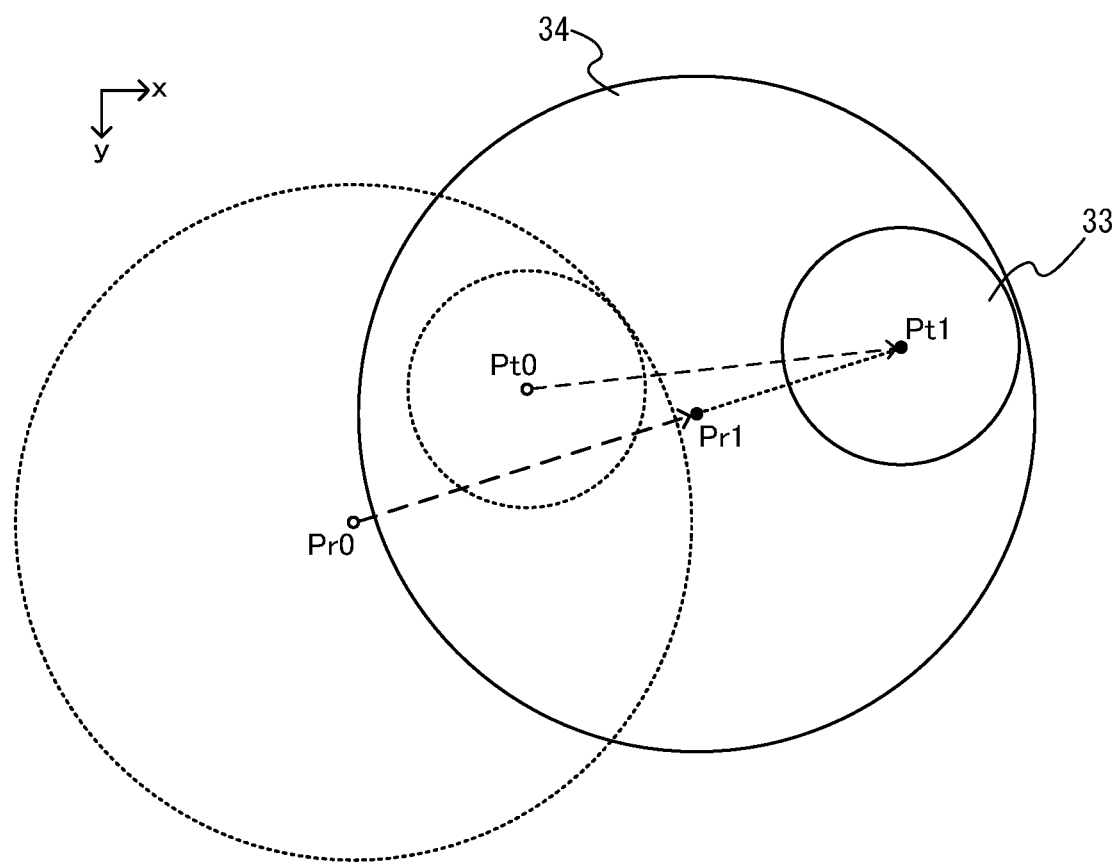
FIG. 8 shows an example of a state in which a reference position is changed.

FIG. 8 shows an example of a state in which a reference position is changed. In FIG. 8, a position Pr0 is a reference position at a certain time point t=0 during a continuous touch input, and a position Pt0 is an input position detected at the time point t=0. In the example of FIG. 8, an input position Pt1 is detected at a time point t=1 which is an input position detection time point subsequent to the time point t=0. In the present embodiment, the reference position is changed from the position Pr0 to a position Pr1 in response to the input position Pt1 being detected (refer to FIG. 8).

Specifically, when the distance from the reference position to the input position exceeds a predetermined distance as a result of shifting of the input position due to the continuous touch input, the terminal device 2 changes the reference position. The predetermined distance has a value determined in advance. For example, the predetermined distance has a value obtained by subtracting the radius r1 of the input position image from the radius r2 of the reference position image 34. Therefore, in the present embodiment, the reference position is set (in other words, changed) such that the input position image 33 is included in the reference position image 34. That is, the input position image 33 is disposed so as to be included in the circular region of the reference position image 34. In another embodiment, the reference position may be set such that the input position (i.e., the center of the input position image 33) is included in the reference position image 34. At this time, the aforementioned predetermined distance is set to the radius r2 of the reference position image 34. In another embodiment, the predetermined distance may be set to a value independent of the radius r1 of the input position image 33 and the radius r2 of the reference position image 34. That is, the sizes of the input position image 33 and the reference position image 34 may not be used for the reference position changing process.

As described above, the terminal device 2 changes the reference position such that the distance from the reference position to the input position is within the aforementioned predetermined distance. In the present embodiment, a post-change reference position Pr1 is determined to be a position on a line segment connecting a pre-change reference position Pr0 and the current input position Pt1, and the distance from the post-change reference position Pr1 to the current input position Pt1 is equal to the aforementioned predetermined distance (refer to FIG. 8).

A specific method for calculating a post-change reference position is arbitrary. For example, in another embodiment, the terminal device 2 may calculate a post-change reference position Pr1 such that the pre-change reference position Pr0 is shifted in a direction according the direction from the pre-change input position Pt0 of the reference position, to the current input position Pt1.

In the case where the reference position is changed as described above, the terminal device 2 calculates an input instruction (an input direction and an input distance) to be used for movement control of the object 31, based on the post-change reference position. The process of controlling the object 31 based on the input instruction is the same before and after the change of the reference position.

As described above, in the present embodiment, the terminal device 2 changes the reference position such that the reference position follows movement of the input position under certain conditions. Thus, the distance between the input position and the reference position is maintained within the aforementioned predetermined distance, which allows the user to easily perform an operation to move the current input position to the opposite side with respect to the reference position. For example, the user can easily change the input position on the right side with respect to the reference position, to a position on the left side with respect to the reference position. That is, the user can easily change an input instruction instructing the rightward direction to an input instruction instructing the leftward direction.

In another embodiment, the terminal device 2 may not execute the process of changing the reference position. That is, even when the distance from the input position to the reference position exceeds the aforementioned predetermined distance, the reference position may not be changed. At this time, the terminal device 2 may restrict the magnitude of the input distance (i.e., may set a maximum value of the input distance). That is, when the distance between the input position to the reference position exceeds the predetermined distance, the terminal device 2 may adopt the input distance as the predetermined distance.

[2-2-2. Second Movement Operation]

Figure 9:
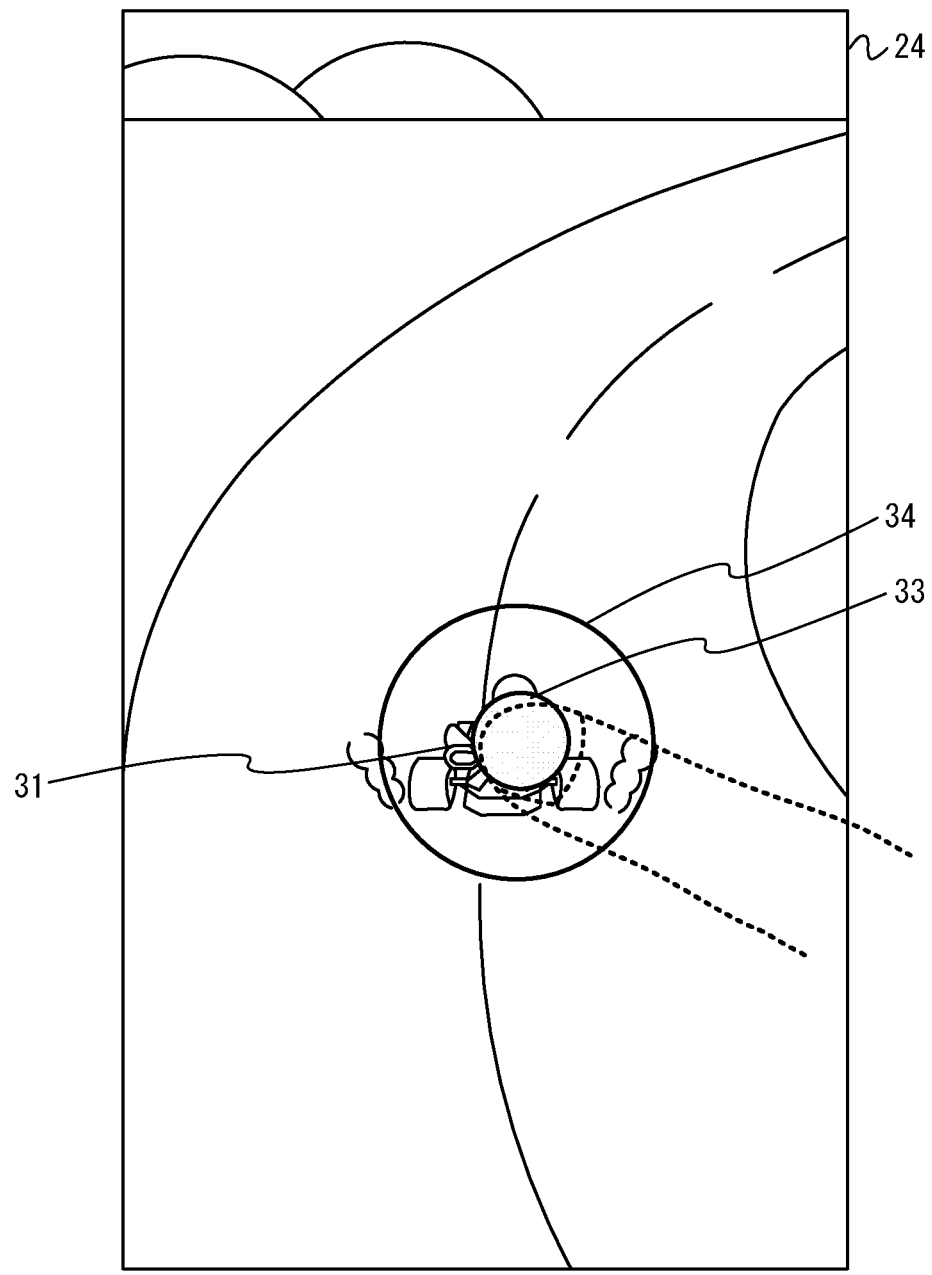
FIG. 9 shows an example of a game image when a touch input is started in the case where a second movement operation is performed.

An action in the case where the second movement operation is performed will be described with reference to FIGS. 9 to 11. FIG. 9 shows an example of a game image when a touch input is started in the case where the second movement operation is performed. As shown in FIG. 9, when a touch input is started at a position within the aforementioned determination area 30, the terminal device 2 determines that the second movement operation is performed.

As shown in FIG. 9, when it is determined that the second movement operation is performed, a reference position is set as in the case of the first movement operation. Also in the second movement operation, as in the first movement operation, the terminal device 2 sets an input position at the time of a touch-on as a reference position. In another embodiment, also in the second movement operation, as in the first movement operation, the reference position may be set regardless of an input position at the time of a touch-on.

Also in the second movement operation, as in the first movement operation, a process of changing the reference position is executed. That is, while the second movement operation is performed, the terminal device 2 changes the reference position such that the reference position is within a predetermined distance from an input position of a continuous touch input. Thus, the user can shift the reference position by shifting the input position away from the position of the object 31 during the second movement operation. Thus, the user can perform the second movement operation even at a position away from the display position of the object 31, thereby preventing the object 31 from being difficult to be viewed due to a finger performing the touch input (refer to FIG. 10). Therefore, according to the present embodiment, operability of the second movement operation, in which the position of the object 31 is the touch-on position, can be improved.

As shown in FIG. 9, upon determining that the second movement operation is performed, the terminal device 2 causes the state of the object 31 to transition to the drift state. Therefore, the second movement operation is performed on the object 31 in the drift state.

FIG. 9 shows an example of a game image including an object in the drift state. As described above, the drift state is a state in which movement control is performed by a method different from that for movement control in the normal state. As shown in FIG. 9, in the drift state, a state in which the object 31 is drifting (specifically, a state in which smoke comes from tires) is displayed.

As described above, in the present embodiment, the transition process to the drift state is executed in response to start of a touch input (in other words, at the time of a touch-on) to a position within the determination area 30. However, the timing to execute the transition process is not limited to the time of a touch-on. In another embodiment, the transition process may be executed at a timing when a condition regarding a touch input to a position within the determination area 30 is satisfied after start of the touch input. For example, the "condition regarding a touch input" may be that the distance between an input position and a reference position (in other words, a touch-on position) becomes equal to or greater than a predetermined drift start distance. At this time, the distance between the input position and the reference position may be a two-dimensional distance on the input surface, or may be a distance in a predetermined direction (e.g., an x-axis component) on the input surface. Furthermore, the terminal device 2 may control the direction of the object at start of the drift state, in accordance with the direction between the input position and the reference position in the case where the above condition is satisfied. That is, when the input position, with the above condition being satisfied, is on the left side with respect to the reference position, the object may be controlled to the leftward drift state (i.e., a drift state in which the object turns to the left). When the input position, with the above condition being satisfied, is on the right side with respect to the reference position, the object may be controlled to the rightward drift state.

The "condition regarding a touch input" may be that an input position of a continuous touch input is shifted from a reference position (in other words, touch-on position), or may be that an input position of a continuous touch input is outside the determination area. Thus, the "condition regarding a touch input" may be a condition based on a reference position and an input position.

In the present embodiment, the operation method for the second movement operation in the drift state is the same as that for first movement operation in the normal state. That is, even when the object 31 is in the drift state, the terminal device 2 specifies an input instruction (specifically, an input direction and an input distance) based on a touch input, as in the case where the object 31 is in the normal state. Thus, the user can operate the object 31 by the same operation method regardless of whether the object 31 is in the normal state or in the drift state. However, the process of controlling movement of the object 31 based on the input instruction differs between the normal state and the drift state.

In the present embodiment, in the drift state, movement of the object 31 is controlled such that the object 31 can go around a curve more sharply than in the normal state at the same speed. A specific method of movement control in the drift state is arbitrary. In another embodiment, in the drift state, movement of the object 31 may be controlled such that the object 31 can go around a curve more quickly than in the normal state. Thus, the terminal device 2 may perform movement control for the object 31 such that the user can control movement of the object 31 more advantageously in terms of the game than in the normal state.

As described above, in the present embodiment, the terminal device 2 executes a process of changing the state of the object 31 regarding movement of the object 31 (i.e., a process causing the object 31 to transition from the normal state to the drift state), as a process to be executed at least on a condition that a touch-on position of a touch input is within a determination area. Then, the terminal device 2 causes the object to move by different control methods that depend on the state of the object 31. That is, the terminal device 2 causes the object 31 to move by different methods between the normal state and the drift state. Therefore, in the present embodiment, the user can properly use the different two types of movement operations by changing the position at which a touch input is started. Thus, the terminal device 2 allows the user to properly use the two types of movement operations by the simple method, thereby allowing the user to perform various operations.

When the continuous touch input of the second movement operation is ended, the terminal device 2 causes the object 31 to transition from the drift state to the normal state. As described above, while no touch input is performed, the terminal device 2 automatically controls the object 31.

In the present embodiment, when the second movement operation is continuously performed for a predetermined acceleration-allowed time period, the object 31 is set (in the drift state and) in an acceleration-allowed state. That is, in the present embodiment, when a predetermined acceleration condition is satisfied while the object 31 is in the drift state, the terminal device 2 sets the object 31 in the acceleration-allowed state. Although details will be described later, if the movement operation is ended (i.e., a touch-off is performed) after the object 31 has been set in the acceleration-allowed state, movement of the object 31 is controlled such that the object 31 is accelerated more than usual.

Figure 10:
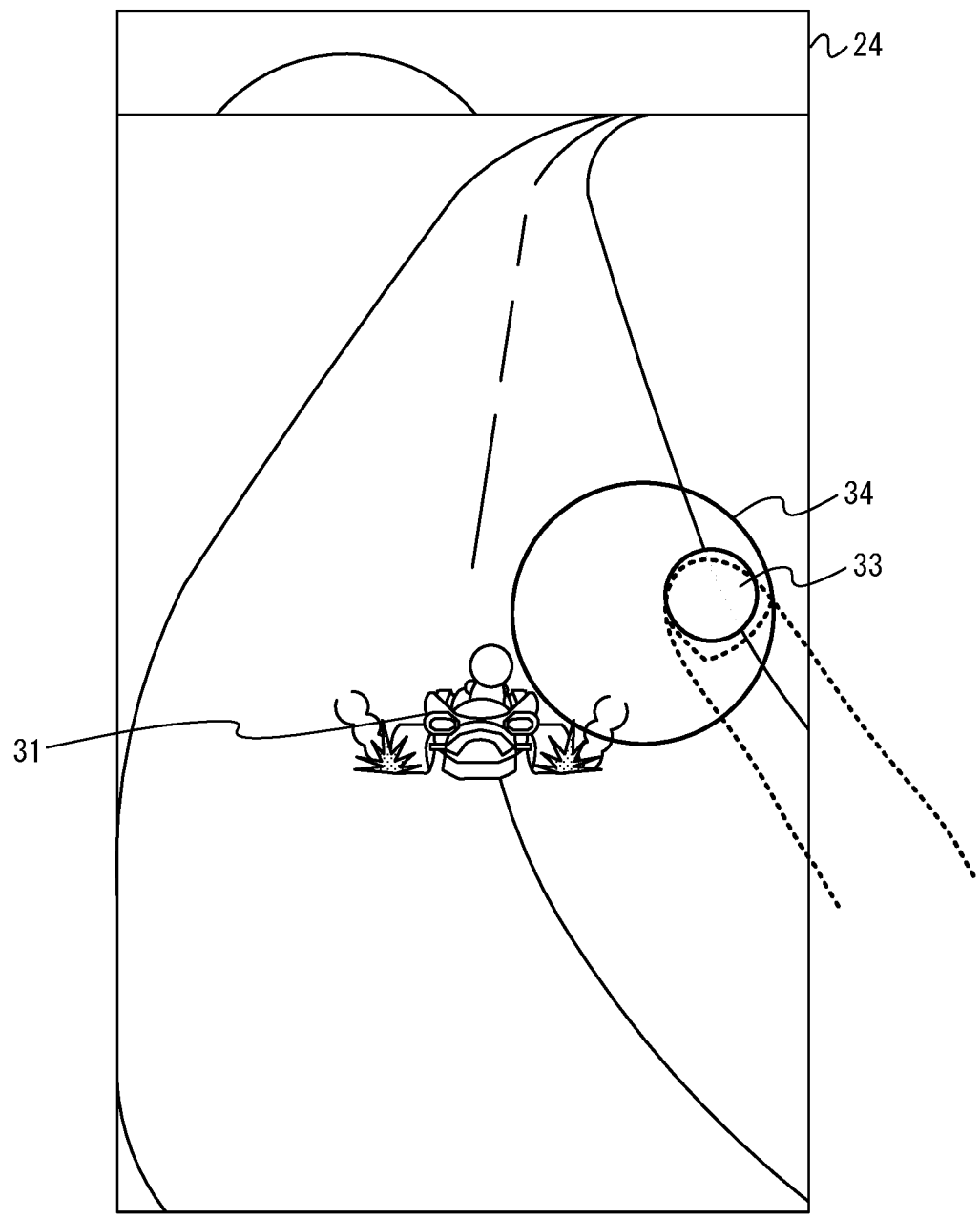
FIG. 10 shows an example of a game image including the object in an acceleration-allowed state.

FIG. 10 shows an example of a game image including an object in the acceleration-allowed state. As shown in FIG. 10, in the acceleration-allowed state, the object 31 is displayed in a display mode representing the drift state (specifically, a display mode in which smoke comes from tires) and in a display mode representing the acceleration-allowed state (specifically, a display mode in which sparks are caused from tires). In the present embodiment, the speed of the object 31 in the drift state is constant regardless of whether the object 31 is in the acceleration-allowed state. However, in another embodiment, when the object 31 in the drift state is in the acceleration-allowed state, the speed of the object 31 may be higher than that in the case where the object 31 is in the drift state but is not in the acceleration-allowed state.

In the present embodiment, the acceleration condition is that the drift state is continued for the predetermined acceleration-allowed time period. That is, the terminal device 2 sets the object 31 in the acceleration-allowed state in response to elapse of the acceleration-allowed time period from when the object 31 is set in the drift state (in other words, from when the second movement operation is started).

In another embodiment, the content of the acceleration condition is arbitrary. For example, the acceleration condition may include a condition that "a continuous touch input represents a predetermined gesture in the drift state", or may include a condition that "a predetermined operation is performed by a continuous touch input in the drift state". Thus, the acceleration condition may be that an input, which satisfies a predetermined condition regarding an input direction and/or an input distance, is made, or that this state is continued for a predetermined time period.

As described above, in the present embodiment, when an input of the second movement operation, which is continuously performed from start of the input, satisfies a predetermined condition (i.e., the acceleration condition), the terminal device 2 executes, on the object 31, a second process (i.e., a process of setting the object 31 in the acceleration-allowed state) which is different from the first process (i.e., a process of setting the object 31 in the acceleration-allowed state). Thus, the user can cause the terminal device 2 to execute the first process and further cause the terminal device 2 to execute the second process, during the second movement operation. That is, the terminal device 2 allows the user to perform more various game operations by the continuous touch input.

The second process may be any process regarding movement of the object 31. For example, the second process may be a process of causing the object 31 to move by a predetermined control method. Therefore, in the present embodiment, "a process of causing the object 31 to move in an accelerated state", which is described later, is also an example of the second process. At this time, the aforementioned predetermined condition is that "the second movement operation is ended" Thus, the predetermined condition may be that "a state, in which a continuous touch input in the second movement operation satisfies a predetermined condition, continues for a predetermined time period", or that "a state, in which a continuous touch input after execution of the first process satisfies a certain condition, continues for a predetermined time period and then the continuous touch input after execution of the first process is ended". In another embodiment, the predetermined condition may be that "a continuous touch input after execution of the first process is ended".

In the present embodiment, when an acceleration operation (i.e., operation to end the touch input) is performed at a timing after the object 31 is set in the acceleration-allowed state, the object 31 travels in the accelerated state. That is, if the second movement operation is ended while the object 31 is in the acceleration-allowed state, the terminal device 2 causes the object 31 to move in the accelerated state. Here, the "accelerated state" is a state in which the object 31 moves at a higher speed than in the normal state.

Figure 11:
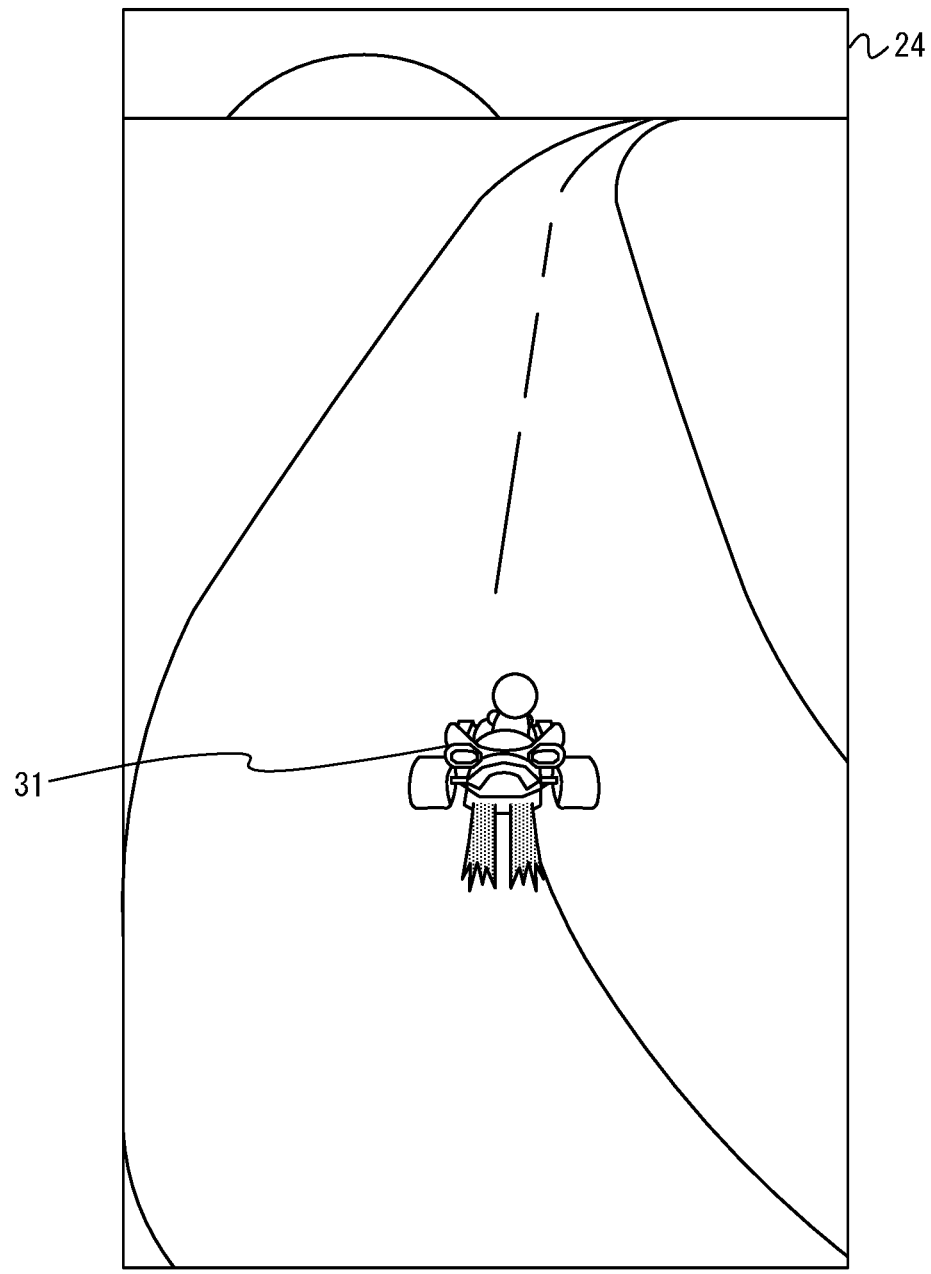
FIG. 11 shows an example of a game image including the object in an accelerated state.

FIG. 11 shows an example of a game image including an object in the accelerated state. As shown in FIG. 11, in the accelerated state, a state in which the object 31 is in the accelerated state (specifically, a state in which the object 31 jets sparks backward) is displayed.

In the present embodiment, the accelerated state is continued for the predetermined acceleration continuation time period. That is, the terminal device 2 causes the object 31 to move in the accelerated state for a time period until the acceleration continuation time period passes from when the second movement operation is ended, and thereafter, the terminal device 2 performs automatic control in the normal state.

As described above, the user operates the object 31 in the drift state to be set in the acceleration-allowed state in the second movement operation and then ends the second movement operation, thereby causing the object 31 to travel faster. For example, the user causes the object 31, which has transitioned to the drift state, to go around a curve of a racing course and then travel in the accelerated state from a position at which the racing course extends straight ahead, thereby causing the object 31 to travel faster.

In another embodiment, the object 31 may take multiple stages of acceleration-allowed states. For example, the object 31 may be controlled such that the object 31 is set in a first acceleration-allowed state in response to the drift state being continued for a first acceleration-allowed time period T1, and then the object 31 is set in a second acceleration-allowed state in response to the drift state being continued for a second acceleration-allowed time period T2 (T2>T1). At this time, the terminal device 2 controls the object 31 such that the accelerated state continues longer in the case where the object 31 transitions from the second acceleration-allowed state to the accelerated state (in response to end of the second movement operation) than in the case where the object 31 transitions from the first acceleration-allowed state to the accelerated state (in response to end of the second movement operation). In another embodiment, the terminal device 2 may control the object 31 such that the speed in the accelerated state is longer in the aforementioned case than in the case where the object 31 transitions from the first acceleration-allowed state to the accelerated state.

Furthermore, the terminal device 2 may display the object 31 such that the multiple stages of acceleration-allowed states can be distinguished from each other. For example, the terminal device 2 may display the object 31 such that the color and/or size of sparks differs between the first acceleration-allowed state and the second acceleration-allowed state.

As described above, in the present embodiment, the user is allowed to perform multiple types of operations (i.e., transition operation to the drift state, movement operation, acceleration state setting operation, and acceleration operation) by a continuous touch input in the second movement operation. Thus, in the present embodiment, the terminal device 2 allows the user to perform various game operations by using the pointing device (i.e., the touch panel).

In the present embodiment, the user can perform each of the movement operations with one finger. Therefore, according to the present embodiment, the user can operate the object 31 with one finger, whereby the user can hold the terminal device 2 with one hand and perform game operations with a thumb of the hand, for example.

Although the case where the movement operations on the object 31 are performed has been described above, operations other than the movement operations may be realized by a touch input in the above embodiment. For example, the terminal device 2 may cause the display section 24 to display icons indicating items, and may receive a touch input designating an icon, as an operation to cause the object 31 to use an item.

[3. Specific Example of Processing in Information Processing System]

Figure 13:
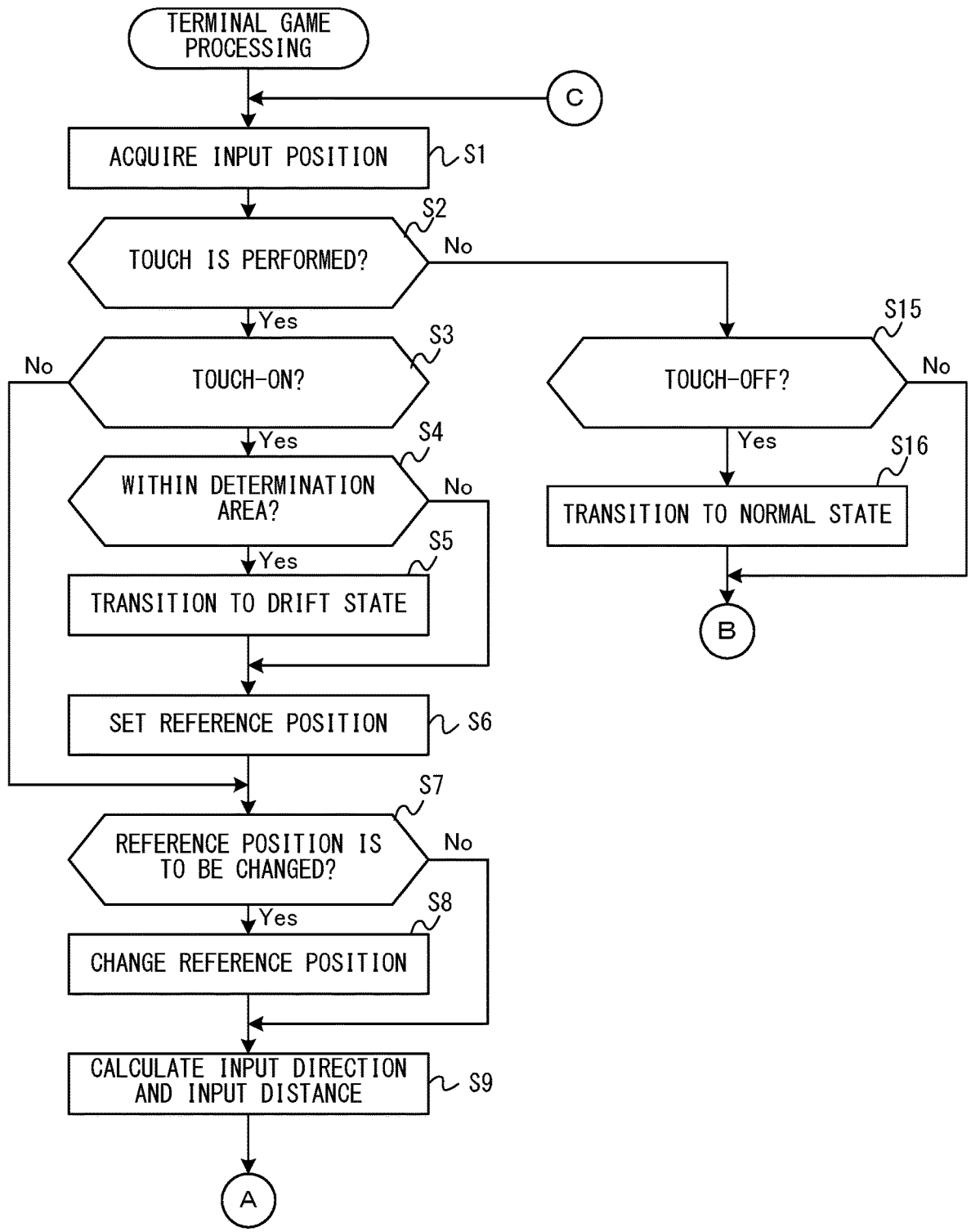
FIG. 13 is a flowchart showing an example of a flow of game processing executed by a non-limiting terminal device.
Figure 14:
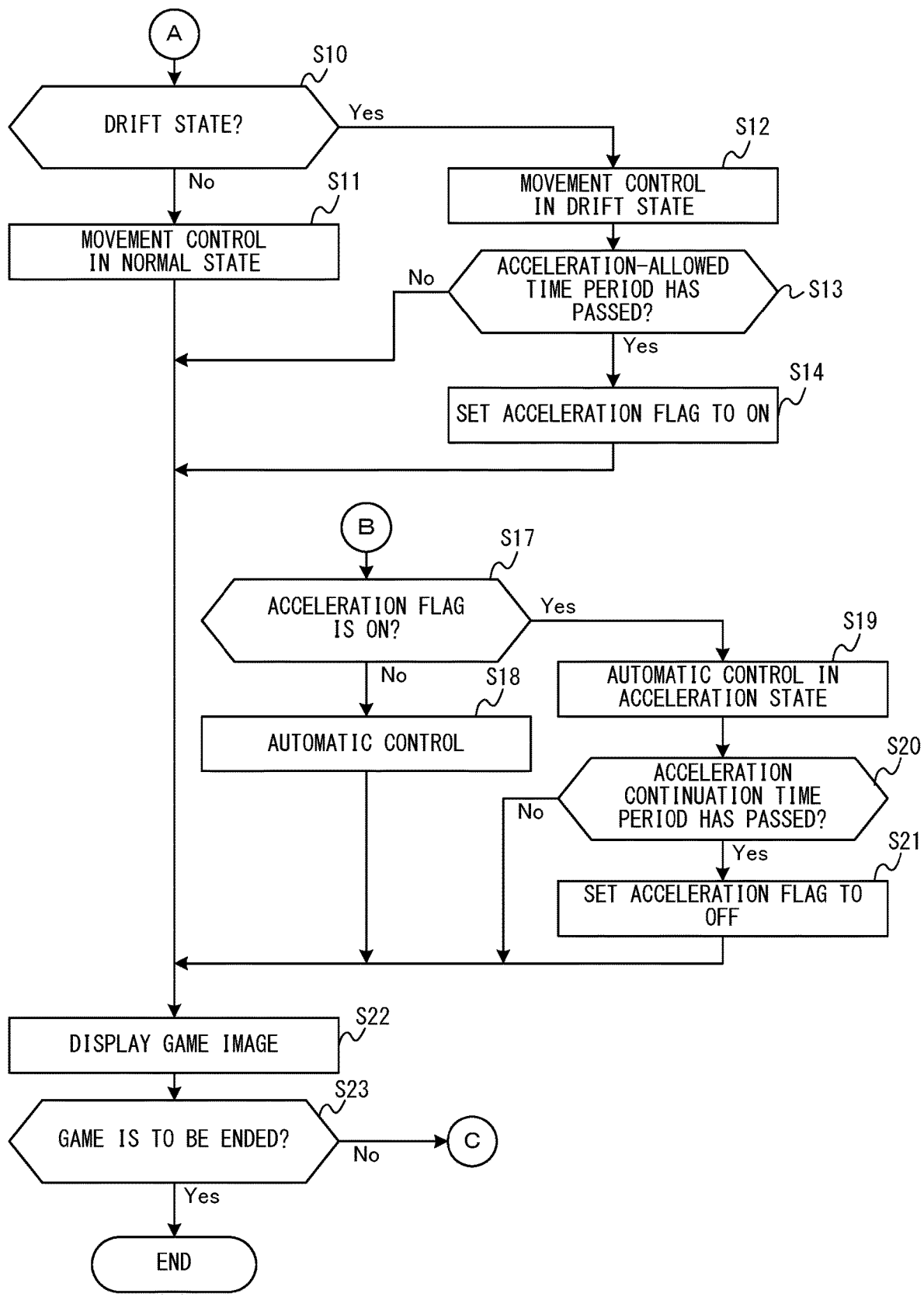
FIG. 14 is a flowchart showing an example of a flow of game processing executed by a non-limiting terminal device.

With reference to FIGS. 12 to 14, a description will be given of a specific example in the case where the game processing whose outline has been described above is executed in the information processing system.

[3-1. Data Used for Processing]

With reference to FIG. 12, specific example of data used for the game processing in the information processing system will be described. FIG. 12 shows examples of data used for the game processing in the information processing system. The data shown in FIG. 12 are stored in a storage section of the terminal device 2 (specifically, a memory of the processing section 21 and/or the storage section 22). As shown in FIG. 12, the terminal device 2 stores therein input position data, reference position data, input instruction data, object position data, object state data, determination area data, and acceleration flag data.

The input position data is data indicating the aforementioned input position. In the present embodiment, the input position data includes data indicating the current input position (in other words, the latest input position), and includes data indicating previous input positions. Specifically, the input position data includes data indicating input positions, regarding a continuous touch input, which are continuously inputted from a touch-on. The content of the input position data may be reset at the time of a touch-off.

The reference position data is data indicating the aforementioned reference position. Each of the input position data and the reference position data is data of two-dimensional coordinates indicating a position on the input surface of the touch panel 23.

The input instruction data indicates the content of the aforementioned input instruction which is specified based on the input position. Specifically, the input instruction data indicates the aforementioned input direction and input distance. As described above, the input instruction data may be data indicating a numerical value in which the input direction is represented by a positive or negative sign and the input distance is represented by an absolute value.

The object position data indicates the position of the object 31 in the game space. For example, the object position data is data indicating three-dimensional or two-dimensional coordinates indicating a position in the game space.

The object state data indicates the state of the object 31. Specifically, the object state data is data indicating that the object 31 is in the normal state or the drift state. In the present embodiment, the object 31 is in the normal state when a game is started (i.e., at start of a racing game), and the object state data indicating the normal state is stored.

The determination area data indicates the position and the range of the determination area set on the input surface. In the present embodiment, since the determination area has a shape of a circle, the determination area data indicates coordinates at the center position of the circle, and the radius of the circle. In the present embodiment, since the determination area is fixedly set, the content of the determination area data has been determined in the game program in advance.

The acceleration flag data is data indicating an acceleration flag which represents whether or not to perform control to cause the object 31 to move in the accelerated state. Although details will be described later, when the object 31 is in the aforementioned acceleration-allowed state or accelerated state, the acceleration flag is set at ON. When the object 31 is neither in the acceleration-allowed state nor in the accelerated state, the acceleration flag is set at OFF. In the present embodiment, the acceleration flag is set to OFF when the game is started.

[3-2. Example of Game Processing]

FIGS. 13 and 14 are flowcharts showing a flow of exemplary game processing executed by the terminal device. A series of process steps shown in FIGS. 13 and 14 is started in response to start of the racing game after the game program stored in the storage section 22 is activated.

In the present embodiment, the CPU (in other words, a processor) of the processing section 21 of the terminal device 2 executes the game program (specifically, the game program for the racing game) stored in the storage section 22, thereby executing the processes in steps shown in FIGS. 13 and 14. However, in another embodiment, some of the processes in the steps may be executed by a processor (e.g., a dedicated circuit or the like) other than the CPU. Furthermore, the processes in the steps shown in FIGS. 13 and 14 are merely examples, and the processing order of the steps may be changed or other processes may be executed in addition to (or instead of) the processes in the steps, so long as similar results can be obtained.

In another embodiment, the processes in the steps shown in FIGS. 13 and 14 may be executed by cooperation of the terminal device 2 and the server 1. That is, some of the processes in the steps shown in FIGS. 13 and 14 may be executed by the server 1. At this time, the server 1 receives data to be used for the processes, from the terminal device 2 via the network 3. The server 1 transmits resultant data obtained through the processes, to the terminal device 2 via the network 3.

The processing section 21 of the terminal device executes the processes in the steps shown in FIGS. 13 and 14 by using a memory. That is, the CPU of the processing section 21 stores, in the memory, information (in other words, data) obtained in the respective process steps. When using the information in the subsequent process steps, the CPU reads out the information from the memory and uses the information.

In step S1 shown in FIG. 13, the processing section 21 acquires an input position from the touch panel 23. That is, the touch panel 23 detects an input position on the input surface thereof, and outputs detection result data indicating the detected input position. The processing section 21 acquires the detection result data from the touch panel 23, and stores input position data including the detection result data in the memory. In the present embodiment, when no touch input is performed to the touch panel 23, the touch panel 23 outputs detection result data indicating that there is no touch input. In this case, the processing section 21 acquires the detection result data indicating that there is no touch input. Next to step S1, the process in step S2 is executed.

In step S2, the processing section 21 determines whether or not a touch input is performed. The processing section 21 performs the determination in step S2, based on the input position data (in other words, the data acquired from the touch panel 23 in the process of step S1) stored in the memory. When the result of the determination in step S2 is positive, the process in step S3 is executed. When the result of the determination in step S2 is negative, the process in step S19 described later is executed.

In step S3, the processing section 21 determines whether or not the touch input is an input at the time of a touch-on. The processing section 21 performs the determination in step S3, based on the input position data stored in the memory. That is, the touch input is determined to be an input at the time of a touch-on when detection result data acquired in step S1 in the last processing loop (specifically, a processing loop of steps S1 to S23) is a value indicating that there is no touch input. On the other hand, the touch input is determined not to be an input at the time of a touch-on when the detection result data acquired in the last processing loop is a value indicating that there is a touch input. When the result of the determination in step S3 is positive, the process in step S4 is executed. When the result of the determination in step S3 is negative, the process in step S4 is skipped and the process in step S5 described later is executed.

In step S4, the processing section 21 determines whether or not a touch-on position is within a determination area. That is, based on the input position data and the determination area data stored in the memory, the processing section 21 determines whether or not an input position (i.e., a touch-on position) indicated by the input position data is located within a determination area indicated by the determination area data. When the result of the determination in step S4 is positive, the process in step S5 is executed. When the result of the determination in step S4 is negative, the process in step S5 is skipped, and the process in step S6 described later is executed.

In step S5, the processing section 21 causes the state of the object 31 to transition to the drift state. That is, the processing section 21 stores object state data indicating the drift state in the memory. Next to step S5, the process in step S6 is executed.

In step S6, the processing section 21 sets a reference position. That is, the processing section 21 sets, as a reference position, the input position acquired through the process in step S1 in the current processing loop. The processing section 21 stores reference position data indicating the set reference position in the memory. Next to step S6, the process in step S7 is executed.

In step S7, the processing section 21 determines whether or not the reference position is to be changed. That is, based on the input position data and the reference position data stored in the memory, the processing section 21 performs the aforementioned determination by the method described in the section of (Reference position changing process). When the result of the determination in step S7 is positive, the process in step S8 is executed. When the result of the determination in step S7 is negative, the process in step S8 is skipped and the process in step S9 described later is executed.

In step S8, the processing section 21 changes the reference position. That is, based on the input position data and the reference position data stored in the memory, the processing section 21 calculates a post-change reference position by the method described in the section of (Reference position changing process). Furthermore, the processing section 21 updates the reference position data stored in the memory to the content indicating the calculated post-change reference position. Next to step S8, the process in step S9 is executed.

In step S9, the processing section 21 specifies the content of an input instruction. That is, with reference to the input position data and the reference position data stored in the memory, the processing section 21 calculates an input direction and an input distance. A specific method for calculating the input direction and the input distance is the method described in the section of [2-2-1. First movement operation]. The processing section 21 stores input instruction data indicating the calculated input direction and input distance in the memory. Next to step S9, the process in step S10 (FIG. 14) is executed.

The processes in steps S10 to S14 will be described with reference to FIG. 14. In step S10, based on the object state data stored in the memory, the processing section 21 determines whether or not the object 31 is in the drift state. When the result of the determination in step S10 is negative (i.e., when the object 31 is in the normal state), the process in step S11 is executed. When the result of the determination in step S10 is positive (i.e., when the object 31 is in the drift state), the process in step S12 is executed.

In step S11, based on the input instruction data stored in the memory, the processing section 21 performs movement control for the object 31 in the normal state. Specifically, the processing section 21 calculates a movement direction and a movement distance of the object 31 in one frame time, and calculates a post-movement position of the object 31, based on the calculated movement direction and movement distance, and the current position of the object 31. The movement control in step S11 is performed by the method described in the section of [2-2-1. First movement operation]. The processing section 21 stores, in the memory, object position data indicating the calculated post-movement position. Next to step S11, the process in step S22 described later is executed.

In step S12, the processing section 21 performs movement control for the object 31 in the drift state. Also in step S12, as in step S11, the processing section 21 calculates a post-movement position of the object 31, based on the input instruction data stored in the memory. However, the movement control in step S12 is, unlike the movement control in step S11, performed by the method described in the section of [2-2-2. Second movement operation]. The processing section 21 stores, in the memory, object position data indicating the calculated post-movement position. Next to step S12, the process in step S13 is executed.

In step S13, the processing section 21 determines whether or not the aforementioned acceleration-allowable time period has passed from the transition of the object 31 to the drift state. When the result of the determination in step S13 is positive, the process in step S14 is executed. When the result of the determination in step S13 is negative, the process in step S14 is skipped, and the process in step S22 described later is executed.

In step S14, the processing section 21 sets an acceleration flag to ON. That is, the processing section 21 stores, in the memory, acceleration flag data indicating that the acceleration flag is ON. Thus, the object 31 is set (in the drift state and) in the acceleration-allowed state. Next to step S14, the process in step S22 described later is executed.

Referring back to FIG. 13, the processes in steps S15 and S16 will be described. In step S15, the processing section 21 determines whether or not the touch input is ended (i.e., whether or not a touch-off is performed). The processing section 21 performs the determination in step S15 based on the input position data stored in the memory. That is, when detection result data acquired in step S1 in the last processing loop (specifically, the processing loop of steps S1 to S23) is a value indicating that there is a touch input, the processing section 21 determines that the touch input is ended. When the detection result data is a value indicating that there is no touch input, the processing section 21 determines that the touch input is not ended yet. When the result of the determination in step S15 is positive, the process in step S16 is executed. When the result of the determination in step S15 is negative, the process in step S16 is skipped, and the process in step S17 (FIG. 14) described later is executed.

In step S16, the processing section 21 causes the state of the object 31 to transition to the normal state. That is, the processing section 21 stores object state data indicating the normal state in the memory. Next to step S16, the process in step S17 is executed.

Referring back to FIG. 14, the processes in steps S17 to S23 will be described. In step S17, based on the acceleration flag data stored in the memory, the processing section 21 determines whether or not the acceleration flag is set at ON. When the result of the determination in step S17 is negative (i.e., when the acceleration flag is set at OFF), the process in step S18 is executed. When the result of the determination in step S17 is positive (i.e., when the acceleration flag is set at ON), the process in step S19 described later is executed.

In step S18, the processing section 21 performs automatic control for the object 31. That is, the processing section 21 calculates a post-movement position of the object 31, by controlling movement of the object 31 in accordance with an algorism that is predetermined in a program of a game application stored in the storage section 12. The processing section 21 stores, in the memory, object position data indicating the calculated post-movement position. Next to step S18, the process in step S22 described later is executed.

On the other hand, in step S19, the processing section 21 performs automatic control for the object 31 in the accelerated state. Also in step S19, as in step S18, the processing section 21 calculates a post-movement position of the object 31, by controlling movement of the object 31 in accordance with an algorism that is predetermined in the program of the game application. However, in step S19, the post-movement position of the object 31 is calculated such that the object 31 moves at a speed higher than a movement speed set in step S18. The processing section 21 stores, in the memory, object position data indicating the calculated post-movement position. Next to step S19, the process in step S20 is executed.

In step S20, the processing section 21 determines whether or not the aforementioned acceleration continuation time period has passed from start of the movement control for the object 31 in the accelerated state (in other words, from when a touch-off is performed). When the result of the determination in step S20 is positive, the process in step S21 is executed. When the result of the determination in step S20 is negative, the process in step S21 is skipped, and the process in step S22 described later is executed.

In step S21, the processing section 21 sets the acceleration flag to OFF. That is, the processing section 21 stores, in the memory, acceleration flag data indicating that the acceleration flag is OFF. Thus, the object 31 is set (in the normal state and) in the accelerated state. Next to step S21, the process in step S22 is executed.

In step S22, the processing section 21 generates a game image, and causes the display section 24 to display the game image. That is, the processing section 21 generates the game image based on the object position data stored in the memory, and causes the display section 24 to display the generated game image. The game image generated in step S22 represents a game space in which the object 31 is located at a position indicated by the object position data. As described above, in the present embodiment, the processing section 21 generates a game image in which the object 31 is placed at a predetermined position on the screen of the display section 24 (a position on a slightly lower side from the center of the screen; refer to FIG. 4, etc.). On the display section 24, an image of the determination area 30 is not displayed. In the process in step S22, the processing section 21 controls actions of other objects (e.g., other characters and/or items) according to need, and generates a game image representing a game space including these objects. Next to step S22, the process in step S23 is executed.

In step S23, the processing section 21 determines whether or not to end the game. That is, the processing section 21 ends the game when a predetermined game end condition is satisfied (e.g., the object operated by the user crosses a finish line), or when a predetermined game end instruction is made by the user. The processing section 21 determines not to end the game, when the game end condition is not satisfied and no predetermined termination instruction is made by the user. When the result of the determination in step S23 is negative, the process in step S1 is executed. The processing section 21 repeats the series of processes in steps S1 to S23 until determining to end the game in step S23. When the result of the determination in step S23 is positive, the processing section 21 ends the game processing shown in FIGS. 13 and 14.

[4. Function and Effect of Present Embodiment, and Modifications]

According to the above-described embodiment, a game program causes an information processing apparatus (e.g., the terminal device 2) having a pointing device (e.g., the touch panel 23) to execute process steps as follows:

an acquisition step (S1) of repeatedly acquiring input positions detected by a pointing device, each input position being a position corresponding to a position on a display screen;

a first process execution step (S5) of executing a predetermined first process on an object in a virtual game space, at least on a condition that an input position detected when an input to the pointing device is started is within a predetermined area (i.e., a determination area);

a reference position setting step (S6) of setting a reference position, based on an input position regarding an input to the pointing device (e.g., an input position detected when the input is started, or an input position detected when a predetermined time period has passed from the start of the input); and a movement process step (S11 or S12) of executing a movement process for causing the object to move, based on the reference position and on the input position of the input which is continuously performed from start of the input to the pointing device.

In the case where the input surface of the pointing device is provided on the display surface (in other words, the display screen is the input surface) as in the above embodiment, the "position corresponding to a position on a display screen" indicates a position on the display screen, and can be regarded as a position on the display screen. On the other hand, in the case where the input surface of the pointing device is different from the display screen (e.g., when the pointing device is a touch pad), the "position corresponding to a position on a display screen" is a position, on the input surface, which can uniquely specify a position on the display screen.

According to the above embodiment, the user can execute the two types of processes, i.e., the first process and the movement process, on the object by a continuous input started from a position within the predetermined area. Therefore, the information processing apparatus allows the user to perform various operations by the simple input method. Specifically, according to the above embodiment, the user is allowed to perform multiple types of operations on the object by a continuous touch input that can be performed with one finger of the user.

According to the above embodiment, whether or not the first process is to be performed depends on whether or not an input position detected when an input is started is within the predetermined area. Therefore, the user can properly use the different two types of operations by changing the position at which an input is started. Also in this respect, the information processing apparatus allows the user to perform various operations by the simple input method.

In the above embodiment, in the reference position setting step, a reference position is set in both the case where the input position detected when the input to the pointing device is started is within a first area and the case where the input position is outside the first area (in other words, regardless of whether or not the input position is within the first area). In the movement process step, the movement process is executed in both the case where the input position detected when the input to the pointing device is started is within the first area and the case where the input position is outside the first area.

Setting of a reference position may be executed at a timing when an input to the pointing device is started as in the above embodiment, or may be executed at a timing after the input is started (specifically, a timing after the input position is changed from the touch-on position) as described later in the section of (First modification regarding determination area).

The "input which is continuously performed from start of the input to the pointing device" is not required to be an input being continued in a strict sense. For example, as for the aforementioned "continuous touch input", a situation can be considered in which, although a touch input is actually performed on the touch panel 23, the touch input is not temporarily detected for a predetermined time period due to erroneous detection. In this case, the terminal device 2 may deal with a touch input detected before the predetermined time period and a touch input detected after the predetermined time period, collectively, as a single continuous touch input. Specifically, when a time period from when a certain touch input has become undetected to when a next touch input is detected is shorter than a predetermined time length, the terminal device 2 may deal with the certain touch input and the next touch input collectively as a single continuous touch input.

In the above embodiment, the first process can be regarded as a process (step S5) for changing the state of the object 31 (more specifically, the state of the object regarding movement of the object). In another embodiment, the terminal device 2 may execute, as the first process, a process of controlling the action of the object, which is different from the aforementioned movement process. For example, the terminal device 2 may execute, as the first process, a process of causing the object to perform an action of jump or attack at the timing to execute step S5, instead of (or together with) the process in step S5.

(First Modification Regarding Determination Area)

Figure 15:
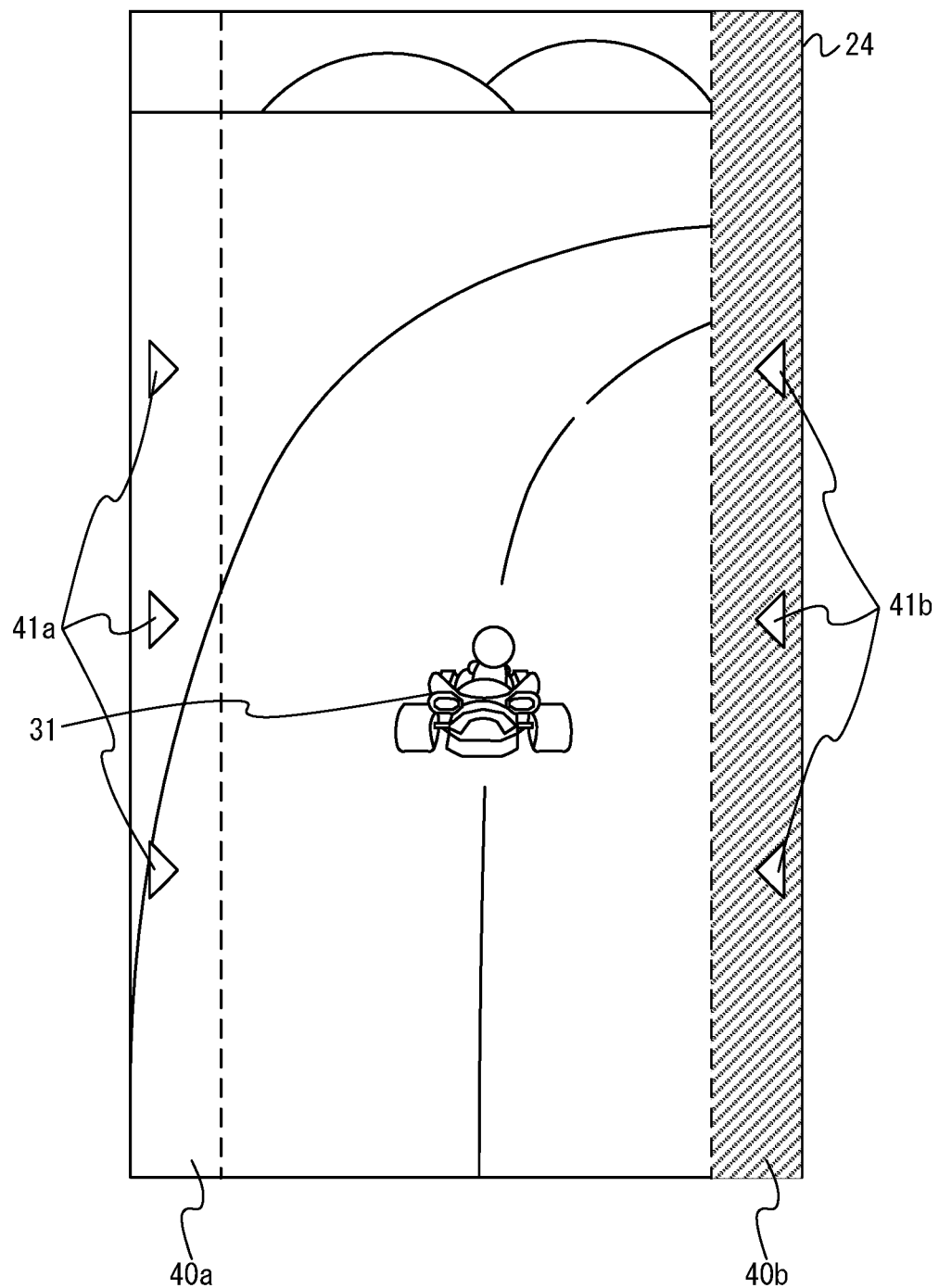
FIG. 15 shows an example of a determination area in a first modification.

In another embodiment, a determination area may not be set based on the position of an object on the display screen. FIG. 15 shows an example of a determination area according to a first modification of the above embodiment. As shown in FIG. 15, in the first modification, determination areas 40a and 40b are fixedly set at opposing right and left ends of the screen of the display section 24, respectively. The left determination area 40a has a rectangular shape including a range up to a predetermined distance from the left side of the screen. The right determination area 40b has a rectangular shape including a range up to a predetermined distance from the right side of the screen. In the description below, the determination areas 40a and 40b may be generically referred to as "determination area 40".

In the first modification, as in the above embodiment, an image representing the determination area 40 is not actually displayed. However, in the first modification, as shown in FIG. 15, left marker images 41a are displayed in the left determination area 40a, and right marker images 41b are displayed in the right determination area 40b. These marker images 41a and 41b can suggest, to the user, a rough position of the determination area (in other words, a position at which a touch input of the second movement operation is to be started).

In the first modification, a method for determining whether a touch input is the first movement operation or the second movement operation is the same as that in the above embodiment. That is, it is determined that the second movement operation is performed when a touch-on position is within the determination area 40, whereas it is determined that the first movement operation is performed when a touch-on position is outside the determination area 40.

Figure 16:
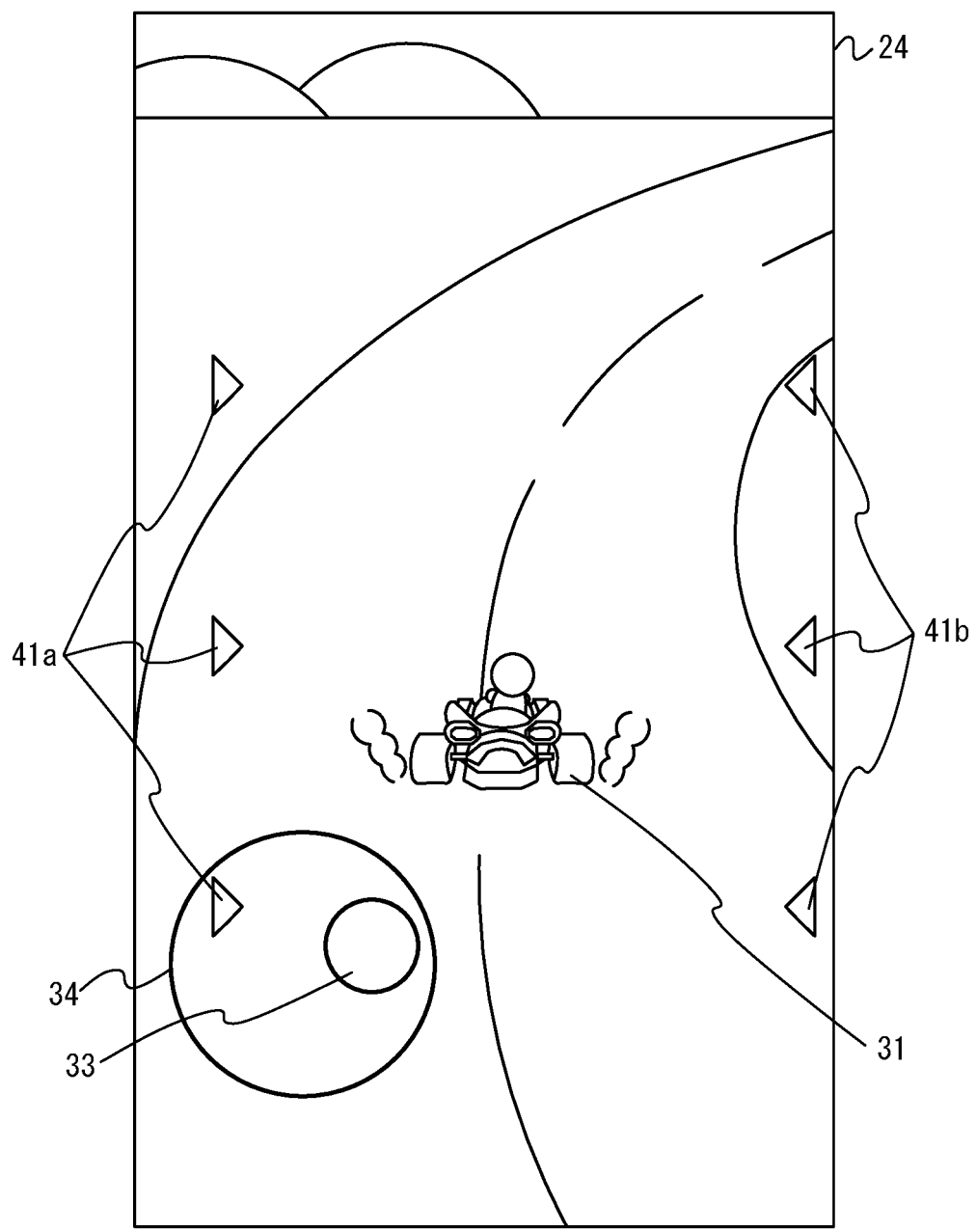
FIG. 16 shows an example of a game image when a second movement operation is performed in the first modification.

FIG. 16 shows an example of a game image when the second movement operation is performed in the first modification. FIG. 16 shows a game image in a state where the user starts a touch input to a position within the left determination area 40a, and then shifts the input position in a direction toward the center of the screen (i.e., a rightward direction). Also in the first modification, as in the above embodiment, the operation image 32 is displayed on the display section 24 in response to the touch input for the movement operation being performed.

In the first modification, when it is determined that the second movement operation is performed, marker images, which are disposed in a determination area (either of the determination areas 40a and 40b) in which the touch input is started, are moved in the direction toward the center of the screen and displayed. In the example of FIG. 16, the left marker images 41a in the left determination area 40a are moved in the direction toward the center of the screen (i.e., the rightward direction) and displayed. Thus, in the first modification, the terminal device 2 moves and displays the marker images in response to the second movement operation being executed. Therefore, the terminal device 2 allows the user to easily recognize whether or not an input with a touch-on position in the determination area is performed (i.e., whether or not the second movement operation is performed).

In the first modification, when the second movement operation is performed, a touch-on position is a position in either of the right and left end positions of the area of the display screen. Therefore, in the first modification, when the touch-on position is in the determination area 40, the terminal device 2 sets, as a reference position, a position obtained by shifting the touch-on position in the direction toward the center of the screen by a predetermined distance from the end portion of the screen. For example, a reference position may be set so as to be outside the determination area 40. Thus, the user can easily designate an input position that is away from the reference position by a predetermined distance in any direction. For example, when a touch-on position is near the left end portion of the screen (i.e., in the left determination area 40a), since a reference position is set on the right side relative to the touch-on position, the user can easily perform a touch input whose input direction is a leftward direction with respect to the reference position (even if the user starts the touch input from near the left lend portion of the screen).

In another embodiment, the terminal device 2 may not perform transition of the object 31 to the drift state at the time of a touch-on of the second movement operation, and may perform transition of the object 31 to the drift state in response to that the distance between a touch-on position (different from a reference position) and an input position becomes equal to or greater than a predetermined drift start distance during the second movement operation. The distance between the input position and the touch-on position may be a two-dimensional distance on the input screen, or may be a distance in a predetermined direction (e.g., an x-axis component) on the input screen. At the time of a touch-on, the terminal device 2 may set a reference position to a position that is shifted from the touch-on position in the direction toward the center of the screen, and may set (in other words, change) the reference position to the touch-on position in response to that the distance between the touch-on position and the input position becomes equal to or greater than the drift start distance (i.e., in response to transition of the object 31 to the drift state).

In the first modification, since the input position and the reference position are different from each other at the time of the touch-on of the second movement operation (in other words, at the time of transition to the drift state), the input distance is sharply increased at the transition timing to the drift state, which may cause the user to have a sense of discomfort to the second movement operation. On the other hand, in the aforementioned other embodiment, since the touch-on position is the reference position at the transition timing to the drift state, the risk of sharp increase in the input distance at the transition timing can be reduced. Therefore, the user is less likely to have a sense of discomfort during the second movement operation, thereby improving operability of the second movement operation.

(Second Modification Regarding Determination Area)

Figure 17:
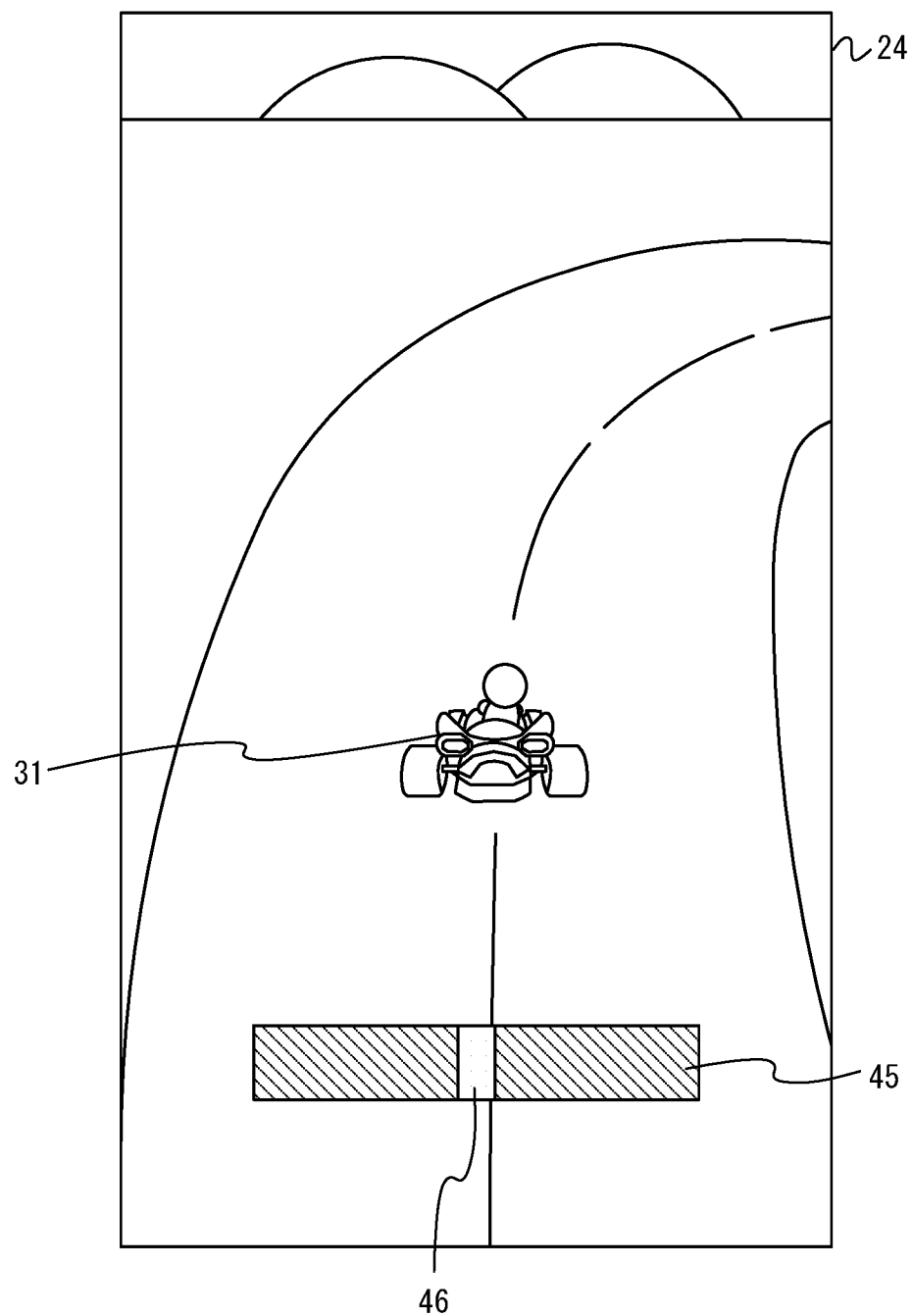
FIG. 17 shows an example of a determination area in a second modification.

FIG. 17 shows an example of a determination area according to a second modification. As shown in FIG. 17, in the second modification, a slider image 45 is displayed on the display section 24, and an area corresponding to the slider image 45 is set as a determination area. That is, in this second modification, it is determined that the second movement operation is performed when a touch-on position of a touch input is within the slider image 45, whereas it is determined that the first movement operation is performed when a touch-on position of a touch input is outside the slider image 45. Thus, the terminal device 2 may cause the display section 24 to display an image representing a determination area.

Figure 18:
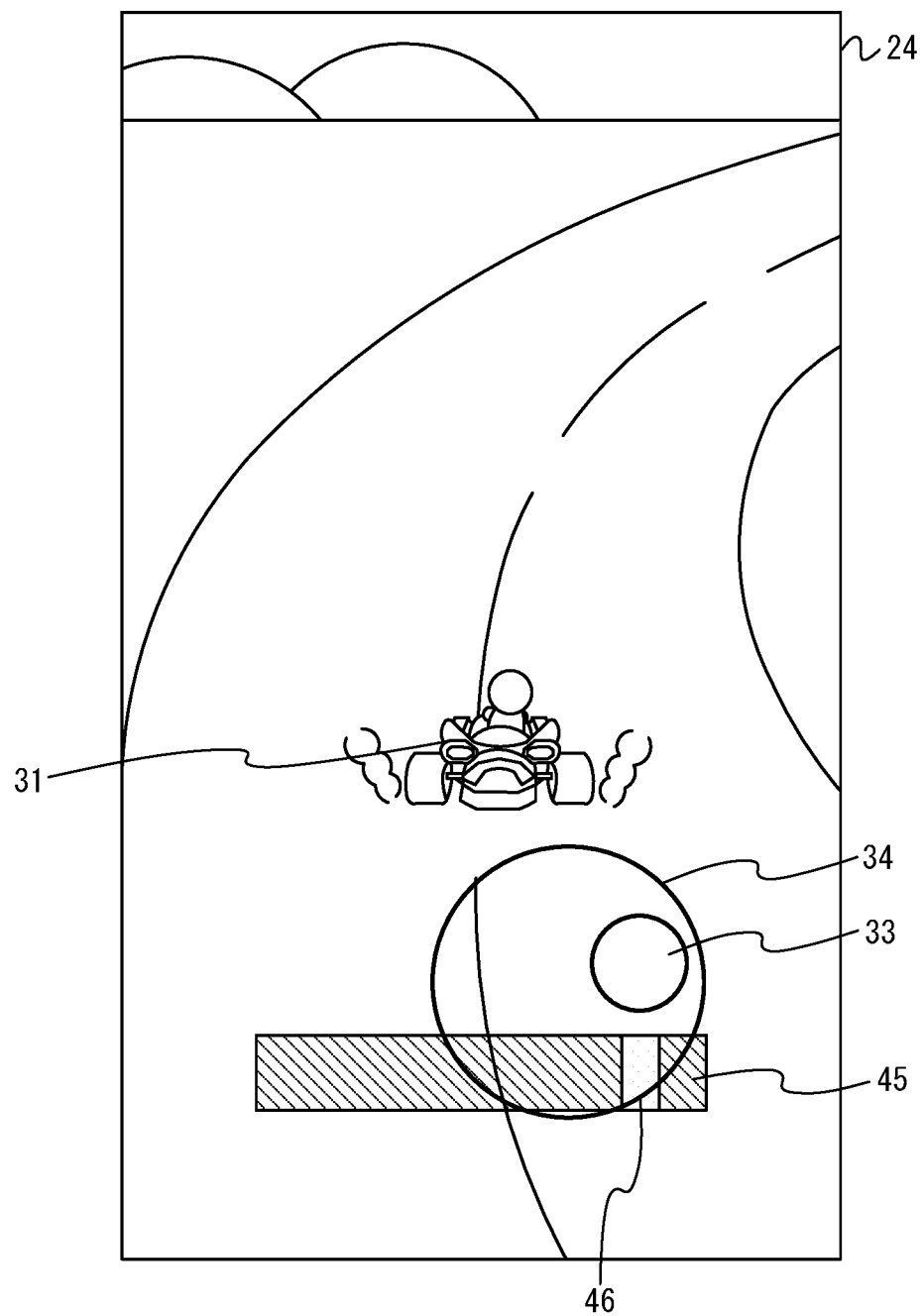
FIG. 18 shows an example of a game image when a second movement operation is performed in the second modification.

FIG. 18 shows an example of a game image when the second movement operation is performed in the second modification. FIG. 18 shows a game image in a state where the user starts a touch input on a position within a slider image 45 (in other words, a determination area) and then shifts the input position in the rightward direction. Also in the first modification, as in the above embodiment, an operation image 32 is displayed on the display section 24 in response to the touch input.

As shown in FIG. 18, the slider image 45 includes a marker image 46. In the second modification, during the second movement operation, the terminal device 2 moves the marker image 46 to a position according to an input direction and an input distance, and displays the marker image 46. In the example of FIG. 18, since the input direction is a rightward direction, the marker image 46 is displayed at a position shifted rightward from the center of the slider image 45. Thus, in the second modification, during the second movement operation, the marker image 46 is moved and displayed as well as the operation image 32. Thus, the terminal device 2 allows the user to easily recognize whether or not an input with a touch-on position in the determination area is performed (i.e., whether or not the second movement operation is performed).

In the second modification, a method for determining whether or not a touch input is the first movement operation or the second movement operation, a method for controlling movement of the object based on movement operation, etc., are the same as those of the above embodiment.

(Modification Regarding Game Content)

In another embodiment, the content of the game executed in the terminal device 2 is not limited to racing, and a game of any content may be executed. For example, in the other embodiment, the game executed in the terminal device 2 may be a game in which an object (i.e., a player character) in an action game is operated by an input to the pointing device. For example, the terminal device 2 may perform movement control to cause the object to move by walking in the movement process in step S11, and cause the object to move by running in the movement process in step S12. At this time, the terminal device 2 may manage the state (i.e., walking or running) regarding the movement method of the object, and cause the state of the object to transition from the walking state to the running state in step S5. Furthermore, the terminal device 2 may perform, in the process of step S19, movement control to cause the object to run at a speed higher than the speed in the movement process of step S12.

In another embodiment, the game executed in the terminal device 2 may be a game in which an object (i.e., a player character) in a shooting game is operated by an input to the pointing device. For example, the terminal device 2 can apply the respective movement operations to a process of causing the object to perform actions regarding shooting. Specifically, the terminal device 2 causes a sight to move in response to the first movement operation, and causes a bullet to be shot in response to a touch-off of the first movement operation. Alternatively, the terminal device 2 causes the object to execute an action of charging power in response to a touch-on of the second movement operation, causes a sight to move in response to the subsequent second movement operation, and causes a bullet to be shot in response to a touch-off of the second movement operation. In this embodiment, a determination area may be set so as to include an object of a gun possessed by the aforementioned object. According to this game example, in the operation of causing the object to perform a shooting action, the user can determine whether or not to shoot a bullet after charging power, depending on whether the movement operation is the second movement operation or the first movement operation.

For the purpose of, for example, achieving various game operations by using a pointing device, it is possible to use the above embodiment as a game program, a game apparatus, and the like.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium storing instructions that, when executed on a computer of an information processing device, cause the computer to perform operations comprising:
   repeatedly acquiring input positions detected by a pointing device, each position corresponding to a position on a display screen;
   setting a first reference position, at least on a condition that an input position detected when a movement operation input to the pointing device is started is outside a predetermined area, on the basis of the input position detected when the movement operation input is started;
   causing an object to move in a virtual game space by a first movement process, based on the first reference position and on the input position of the input which is continuously performed from start of the movement operation input;
   setting a second reference position, at least on condition that the input position detected when the movement operation input to the pointing device is started is within the predetermined area, on the basis of the input position detected when the movement operation input is started; and
   causing the object to move in the virtual game space by a second movement process different from the first movement process, based on the second reference position and on the input position of the input which is continuously performed from start of the movement operation input, wherein:
   in the first movement process, a movement direction of the object is changed in the virtual game space, based on a distance between the first reference position and the input position,
   in the second movement process, the movement direction of the object is changed in the virtual game space, based on a distance between the second reference position and the input position, and
   when the distance between the first reference position and the input position is equal to the distance between the second reference position and the input position, an amount of change in the movement direction of the object in the first movement process is different from an amount of change in the movement direction of the object in the second movement process.

2. The non-transitory computer-readable storage medium according to claim 1, wherein when the distance between the first reference position and the input position is equal to the distance between the second reference position and the input position, the amount of change in the movement direction of the object in the second movement process is greater than the amount of change in the movement direction of the object in the first movement process.

3. The non-transitory computer-readable storage medium according to claim 1, wherein the predetermined area is set so as to include a position on an input screen of the pointing device, the position corresponding to a position, on the display screen, in which the object is displayed.

4. The non-transitory computer-readable storage medium according to claim 3, wherein the instructions, when executed, cause the computer to perform further operations comprising displaying, on the display screen, an image of the virtual game space such that the object is fixedly disposed at a predetermined position on the display screen during a predetermined time period in which the first movement process and the second movement process are executable.

5. The non-transitory computer-readable storage medium according to claim 3, wherein the instructions, when executed, cause the computer to perform further operations comprising displaying, on the display screen, an image of a game space that does not include an image representing the predetermined area, during a predetermined time period in which the first movement process and the second movement process are executable.

6. The non-transitory computer-readable storage medium according to claim 3, wherein the instructions, when executed, cause the computer to perform further operations comprising changing the reference position set to a position within a predetermined distance from the input position of the input which is continuously performed from start of the input to the pointing device.

7. The non-transitory computer-readable storage medium according to claim 1, wherein the instructions, when executed, cause the computer to perform further operations comprising executing a predetermined process on the object, in the case where the input position detected when the movement operation input is started is within the predetermined area, and where the input which is continuously performed from start of the movement operation input satisfies a predetermined condition.

8. The non-transitory computer-readable storage medium according to claim 7, wherein the predetermined process relates to movement of the object.

9. The non-transitory computer-readable storage medium according to claim 7, wherein the predetermined process is executed in response to end of the input which is continuously performed from start of the movement operation input.

10. An information processing apparatus comprising:
a memory for storing instructions; and
one or more processors in communication with the memory, wherein the instructions, when executed, configure the one or more processors to perform operations comprising:
repeatedly acquiring input positions detected by a pointing device, each position corresponding to a position on a display screen;
setting a first reference position, at least on a condition that an input position detected when a movement operation input to the pointing device is started is outside a predetermined area, on the basis of the input position detected when the movement operation input is started;
causing an object to move in a virtual game space by a first movement process, based on the first reference position and on the input position of the input which is continuously performed from start of the movement operation input;
setting a second reference position, at least on condition that the input position detected when the movement operation input to the pointing device is started is within the predetermined area, on the basis of the input position detected when the movement operation input is started; and
causing the object to move in the virtual game space by a second movement process different from the first movement process, based on the second reference position and on the input position of the input which is continuously performed from start of the movement operation input, wherein:
in the first movement process, a movement direction of the object is changed in the virtual game space, based on a distance between the first reference position and the input position,
in the second movement process, the movement direction of the object is changed in the virtual game space, based on a distance between the second reference position and the input position, and
when the distance between the first reference position and the input position is equal to the distance between the second reference position and the input position, an amount of change in the movement direction of the object in the first movement process is different from an amount of change in the movement direction of the object in the second movement process.

11. An information processing system comprising:
a memory for storing instructions; and
one or more processors in communication with the memory, wherein the instructions, when executed, configure the one or more processors to perform operations comprising:
repeatedly acquiring input positions detected by a pointing device, each position corresponding to a position on a display screen;
setting a first reference position, at least on a condition that an input position detected when a movement operation input to the pointing device is started is outside a predetermined area, on the basis of the input position detected when the movement operation input is started;
causing an object to move in a virtual game space by a first movement process, based on the first reference position and on the input position of the input which is continuously performed from start of the movement operation input;
setting a second reference position, at least on condition that the input position detected when the movement operation input to the pointing device is started is within the predetermined area, on the basis of the input position detected when the movement operation input is started; and
causing the object to move in the virtual game space by a second movement process different from the first movement process, based on the second reference position and on the input position of the input which is continuously performed from start of the movement operation input, wherein:

in the first movement process, a movement direction of the object is changed in the virtual game space, based on a distance between the first reference position and the input position, in the second movement process, the movement direction of the object is changed in the virtual game space, based on a distance between the second reference position and the input position, and when the distance between the first reference position and the input position is equal to the distance between the second reference position and the input position, an amount of change in the movement direction of the object in the first movement process is different from an amount of change in the movement direction of the object in the second movement process.

12. The information processing system according to claim 11, wherein when the distance between the first reference position and the input position is equal to the distance between the second reference position and the input position, the amount of change in the movement direction of the object in the second movement process is greater than the amount of change in the movement direction of the object in the first movement process.

13. The information processing system according to claim 11, wherein the predetermined area is set so as to include a position on an input screen of the pointing device, the position corresponding to a position, on the display screen, in which the object is displayed.

14. The information processing system according to claim 13, wherein the instructions, when executed, configure the one or more processors to perform operations further comprising displaying, on the display screen, an image of a game space that does not include an image representing the predetermined area, during a predetermined time period in which the first movement process and the second movement process are executable.

15. The information processing system according to claim 13, wherein the instructions, when executed, configure the one or more processors to perform operations further comprising displaying, on the display screen, an image of the virtual game space such that the object is fixedly disposed at a predetermined position on the display screen during a predetermined time period in which the first movement process and the second movement process are executable.

16. A game processing method executed in an information process system, the method comprising:
acquiring input positions detected by a pointing device, each position corresponding to a position on a display screen;
setting a first reference position, at least on a condition that an input position detected when a movement operation input to the pointing device is started is outside a predetermined area, on the basis of the input position detected when the movement operation input is started;
causing an object to move in a virtual game space by a first movement process, based on the first reference position and on the input position of the input which is continuously performed from start of the movement operation input;
setting a second reference position, at least on condition that the input position detected when the movement operation input to the pointing device is started is within the predetermined area, on the basis of the input position detected when the movement operation input is started; and
causing the object to move in the virtual game space by a second movement process different from the first movement process, based on the second reference position and on the input position of the input which is continuously performed from start of the movement operation input, wherein:
in the first movement process, a movement direction of the object is changed in the virtual game space, based on a distance between the first reference position and the input position,
in the second movement process, the movement direction of the object is changed in the virtual game space, based on a distance between the second reference position and the input position, and
when the distance between the first reference position and the input position is equal to the distance between the second reference position and the input position, an amount of change in the movement direction of the object in the first movement process is different from an amount of change in the movement direction of the object in the second movement process.

17. The game processing method according to claim 16, wherein when the distance between the first reference position and the input position is equal to the distance between the second reference position and the input position, the amount of change in the movement direction of the object in the second movement process is greater than the amount of change in the movement direction of the object in the first movement process.

18. The game processing method according to claim 16, wherein the predetermined area is set so as to include a position on an input screen of the pointing device, the position corresponding to a position, on the display screen, in which the object is displayed.

19. The game processing method according to claim 18, further comprising displaying, on the display screen, an image of the virtual game space such that the object is fixedly disposed at a predetermined position on the display screen during a predetermined time period in which the first movement process and the second movement process are executable.

20. The game processing method according to claim 18, further comprising displaying, on the display screen, an image of a game space that does not include an image representing the predetermined area, during a predetermined time period in which the first movement process and the second movement process are executable.

* * * * *